United States Patent
Gross et al.

(10) Patent No.: US 11,288,062 B2
(45) Date of Patent: Mar. 29, 2022

(54) AUTOMATIC SOURCE CODE REFACTORING

(71) Applicant: SAP SE, Walldorf (DE)

(72) Inventors: Joachim Gross, Altrip (DE); Jan Portisch, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/711,318

(22) Filed: Dec. 11, 2019

(65) Prior Publication Data

US 2021/0182055 A1 Jun. 17, 2021

(51) Int. Cl.
 G06F 8/72 (2018.01)
 G06F 8/20 (2018.01)
 G06F 8/51 (2018.01)

(52) U.S. Cl.
 CPC ............. *G06F 8/72* (2013.01); *G06F 8/24* (2013.01); *G06F 8/51* (2013.01)

(58) Field of Classification Search
 CPC ..... G06F 8/24; G06F 8/40; G06F 8/51; G06F 8/70; G06F 8/72
 USPC .................................. 717/136–137
 See application file for complete search history.

(56) References Cited

U.S. PATENT DOCUMENTS

| | | | | |
|---|---|---|---|---|
| 6,526,569 | B1 * | 2/2003 | Obin | G06F 8/51 717/140 |
| 8,627,281 | B2 * | 1/2014 | Tatsubori | G06F 8/436 717/114 |
| 8,984,497 | B2 * | 3/2015 | Takeuchi | G06F 8/51 717/137 |
| 9,317,266 | B1 * | 4/2016 | Muldoon | G06F 8/51 |
| 10,437,587 | B2 * | 10/2019 | Grisa | G06F 8/72 |
| 2011/0131556 | A1 * | 6/2011 | Tatsubori | G06F 8/30 717/137 |
| 2013/0174131 | A1 * | 7/2013 | Takeuchi | G06F 8/51 717/137 |
| 2017/0139705 | A1 * | 5/2017 | Grisa | G06F 8/72 |

(Continued)

OTHER PUBLICATIONS

Gross, J., "Migration from Function Groups to ABAP-OO Artifacts; the manual way 1/3", SAP [online], Jul. 26, 2018 [retrieved Dec. 20, 2020], Retrieved from Internet: <URL: https://blogs.sap.com/2018/07/26/migration-from-function-groups-to-abap-oo-artifacts-the-manual-way-13/>, whole document.*

(Continued)

*Primary Examiner* — Todd Aguilera
(74) *Attorney, Agent, or Firm* — Klarquist Sparkman, LLP

(57) ABSTRACT

Techniques and solutions are described for automatically refactoring code. In particular, disclosed technologies provide for automatically refactoring code that includes function calls, which can be to particular types of functions, such as external functions or functions that are not member functions of a class. For code to be refactored, an interface and a class are created. The class implements the interface. Method declarations corresponding to the function calls being refactored are added to the interface and the class. Code is added instantiating an object of the class. Implementations for the methods in the class can call the functions called by the source code being refactored, or can include code implementing the functionality of the called functions. Refactored code has function calls replaced with calls to corresponding methods of the interface.

20 Claims, 30 Drawing Sheets

(56) References Cited

U.S. PATENT DOCUMENTS

2020/0074049 A1* 3/2020 Ekambaram ............ G06F 21/14

OTHER PUBLICATIONS

Gross, J., "Migration from Function Groups to ABAP-OO Artifacts; the manual way 2/3", SAP [online], Jul. 26, 2018 [retrieved Dec. 20, 2020], Retrieved from Internet: <URL: https://blogs.sap.com/2018/07/26/migration-from-function-groups-to-abap-oo-artifacts-the-manual-way-23/>, whole document.*

Gross, J., "Migration from Function Groups to ABAP-OO Artifacts; the manual way 3/3", SAP [online], Jul. 26, 2018 [retrieved Dec. 20, 2020], Retrieved from Internet: <URL:https://blogs.sap.com/2018/07/26/migration-from-function-groups-to-abap-oo-artifacts-the-manual-way-33/ >, whole document.*

Anonymous, "Interface in Java | Extending, Implementing Interface", Scientech Easy [online], May 1, 2019 [retrived Dec. 22, 2020], Retrieved from Internet: <URL: https://www.scientecheasy.com/2019/05/interface-in-java.html/>, whole document.*

"What is function group?" SAP, https://answers.sap.com/questions/3715368/what-is-function-group.html, Mar. 4, 2008, 10 pages.

"Function Groups" https://help.sap.com/viewer/10a002cd6c531014b5e1cb16d2455072/7.0.36/en-US/9fdb992335c111d1829f0000e829fbfe.html, at least as early as Dec. 11, 2019, 2 pages.

Patel, "When to use Local Class and when not to!" ZEVOLVING, http://zevolving.com/2012/01/when-to-use-local-class-and-when-not-to/, Jan. 9, 2012, 3 pages.

Classes, https://help.sap.com/saphelp_em900/helpdata/en/c3/225b5c54f411d194a60000e8353423/content.htm?no_cache=true, at least as early as Dec. 11, 2019, 6 pages.

Class implantation file, Wikipedia, https://en.wikipedia.org/wiki/Class_implementation_file, at least as early as Dec. 11, 2019, 5 pages.

Modularization in ABAP: Macro, Subroutines & Function Modules, https://www.guru99.com/sap-macro-include-function-module-group-subroutine.html, at least as early as Dec. 11, 2019, 11 pages.

SAP ABAP—Function Modules, https://www.tutorialspoint.com/sap_abap/sap_abap_function_modules.htm, at least as early as Dec. 11, 2019, 1 page.

What is Function Module, Tutorials Campus, https://www.tutorialscampus.com/sap-abap/function-modules.htm, at least as early as Dec. 11, 2019, 8 pages.

What are sy-subrc value 1,2,5,6 means, https://answers.sap.com/questions/2859272/what-are-sy-subrc-value-1-2-5-6-means.html, Aug. 23, 2007, 9 pages.

ABAP Objects, https://www.techopedia.com/definition/16348/abap-objects, Jan. 31, 2013, 2 pages.

SAP ABAP—Objects, https://www.tutorialspoint.com/sap_abap/sap_abap_objects.htm, at least as early as Dec. 11, 2019, 2 pages.

Class Methods, Tutorials Campus, https://www.tutorialscampus.com/sap-abap/class-methods.htm, at least as early as Dec. 11, 2019, 5 pages.

What are Function Modules? How to create a Function Module in SAP, https://www.sapnuts.com/courses/core-abap/modularization-in-abap/create-function-modules.html, Aug. 10, 2017, 10 pages.

* cited by examiner

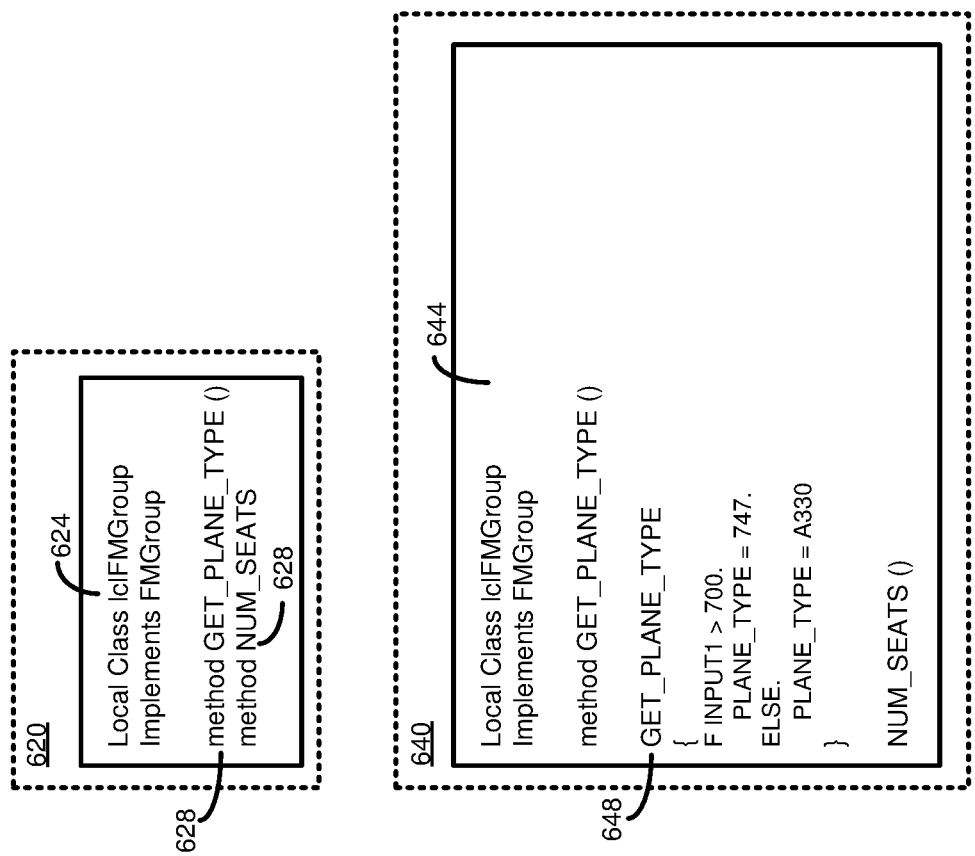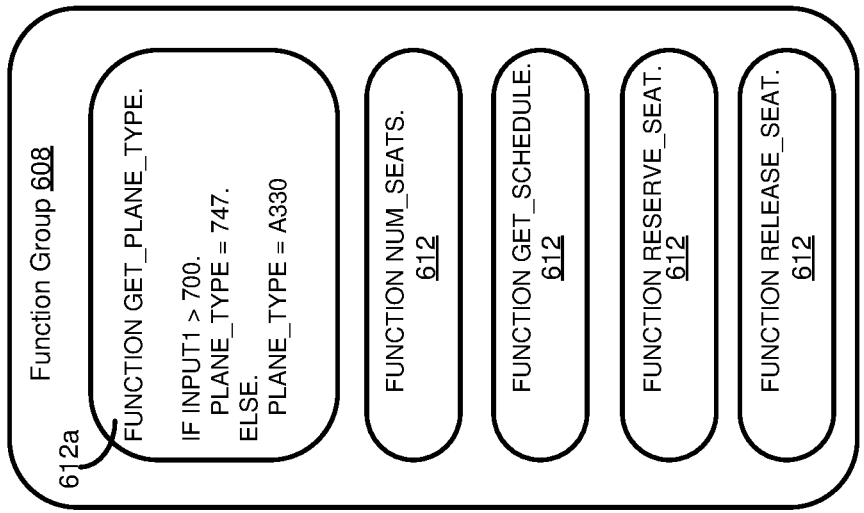
FIG. 6

1. refactroingTarget ← obtainRefactoringTargetFromUser()
2. List<FunctionModule> fmList← scanCodeForExternalCalls(refactoringTarget)
3. lifReference ← generateInterface(refactoringTarget)
4. lclReference ← generateLocalClass(refactoringTarget)
5. IF(Type(refactoringTarget) == FunctionGroup)
6.     addLocalClassInitializationToLoadOfProgram(refactoringTarget)
7. ELSE
8.     addLocalClassInitializationToConstructor(refactoringTarget)
9. END IF
10. FOR EACH functionModule IN fmList DO
11.     copyFunctionSignatureToInterface(functionModule, lifReference)
12.     copyFunctionImplementationToLocalClass(functionModule, lclReference)
13.     replaceAllCalls(functionModule, refactoringTarget)
14. END FOR

FIG. 7

```
1.  FUNCTION zjg_fg_mod_docl.
2.  *"----------------------------------------
3.  *"Local Interface:
4.  *"----------------------------------------
5.
6.   DATA lt_rettab TYPE bapirettab.
7.
8.   CALL FUNCTION 'ZJG_FM1_1'
9.       EXPORTING
10.        iv_guid = '1111112222222'
11.        if_flag = 'X'
12.      TABLES
13.        return = lt_rettab
14.      EXCEPTIONS
15.        not_found = 2
16.        some_error = 6
17.        OTHERS = 99
18.
19.   CASE sy-subrc.
20.      WHEN 2.
21. * react on error not_found
22.      WHEN 6.
23. * react on error some_error
24.      WHEN 99
25. * react on error others.
26.   ENDCASE.
27.
28. ENDFUNCTION.
```

```
1.  *&---------------------
2.  *& Include LZJG_FG_MOD_DOC_AFTERD01
3.  *&--------------------
4.  INTERFACE lif_docs.
5.    TYPES tt_bapiret2 TYPE STANDARD TABLE OF bapiret2 WITH DEFAULT KEY.
6.    METHODS zjg_fml_1
7.      IMPORTING
8.         iv_guide TYPE guid_16 DEFAULT '12345678123456678'
9.         if_flag TYPE char_01 DEFAULT 'X'
10.     CHANGING
11.        return TYPE tt_bapiret2
12.     RAISING
13.        zjg_cx_doc_after " already generated
14.
15.
16. END INTERFACE.
17. CLASS lcl_doc DEFINITION
18. PUBLIC SECTION.
19.    INTERFACES lif_doc.
20. ENDCLASS.
21.
22. CLASS lcl.doc IMPLEMENTATION.
23.   METHOD lif_doc~zjg_fm1_1.
24.     CALL FUNCTION 'ZJG_FM1_1'
25.       EXPORTING
26.           iv_guid = iv_guid
27.           if_flag = if_flag
28.       TABLES
29.           return = return
30.       EXCEPTIONS
31.           not_found = 1
32.           some_error =2
33.           OTHERS = 3.
34.       CASE sy-subrc.
35.           WHEN 1.
36.             RAISE EXCEPTION TYPE zjg_cx_doc_after
37.                   EXPORTING
38.                      former_exception = "NOT_FOUND".
39.           WHEN 2.
40.             RAISE EXCEPTION TYPE zjg_cx_doc_after
41.                   EXPORTING
42.                      former_exception = "SOME_ERROR".
43.           WHEN OTHERS.
44.             RAISE EXCEPTION TYPE zjg_cx_doc_after
45.                   EXPORTING
46.                      former_exception = 'OTHERS'.
47.      ENDCASE.
48.      ENDMETHOD.
49.   ENDCLASS.
```

FIG. 9

```
1.  FUNCTION-POOL zjg_fg_mod_doc_after.    "MESSAGE-ID ..
2.
3.  INCLUDE lzjg_fg_mod_doc_afterd01.      " Local class definition
4.
5.  LOAD-OF-PROGRAM.
6.      DATA mo_doc TYPE REF TO lif_doc.
7.
8.      mo_doc = NEW lcl_doc().
```

FIG. 10

```
1.  FUNCTION zjg_fg_mod_doc_after.
2.  *"----------------------------------------
3.  *"Local Interface:
4.  *"----------------------------------------
5.   DATA lt_rettab TYPE bapirettab.
6.   TRY.
7.      mo_doc->zjg_fm_1(
8.        EXPORTING
9.          iv_guid = '1111112222222'
10.         if_flag = 'X'
11.       CHANGING
12.         return = lt_rettab
13.     ).
14.  CATCH zjg_cx_doc_after INTO DATA (lx_error).
15.     CASE
16.       WHEN 'SOME_ERROR'.
17.            sy-subrc =6.
18.       WHEN 'NOT_FOUND'.
19.            sy-subrc = 2.
20.       WHEN 'OTHERS'
21.            sy-subrc = 99
22.     ENDCASE.
23.  ENDTRY.
24.  CASE sy-subrc.
25.     WHEN 2.
26. * react on error not_found
27.     WHEN 6.
28. * react on error some_error
29.     WHEN 99
30. * react on error others.
31.  ENDCASE.
32. ENDFUNCTION.
```

FIG. 11

```
CLASS ZJG_ASE_REFACT_CL_CONVERT_ABS IMPLEMENTATION.                                      1200

* <SIGNATURE>---------------------------------------------------------------------------+
* | Instance Private Method ZJG_ASE_REFACT_CL_CONVERT_ABS->CREATE_DOC_FOR_DECOUPLING
* +--------------------------------------------------------------------------------------+
* | [--->] IT_DOC_FUNCTION_MODULES    TYPE     ZJG_ASE_REFACT_IF_COMMON_TYPES=>
     TS_FUGR_DEFINITION-FUNCTION_MODULES
* | [--->] IS_CONTROL                 TYPE     TS_CONTROL
* | [<-->] CS_CLASS_DEFINITION        TYPE     ZJG_ASE_REFACT_IF_COMMON_TYPES=>TS_CLASS_DEF
* | [!CX!] ZCX_ASE_REFACT
* +----------------------------------------------------------------------</SIGNATURE>    1204
  METHOD create_doc_for_decoupling.
* fill locals_def and locals_imp.
    DATA ls_interface_definition TYPE zjg_ase_refact_if_common_types=>ts_interface_def.
    DATA lv_source TYPE string.

IF is_control-target-class_creation-create_doc_wrapper = abap_false.
      RETURN.
    ENDIF.

*   get function module signature and generate interface (interface is returned)
    ls_interface_definition = convert_fm_def_to_intf_def( is_target           = is_control-target
                                    iv_intf_name        = is_control-target-class_creation-doc_intf_name
                                    it_function_modules_def = it_doc_function_modules ).

ls_interface_definition-interface_header-clsname = is_control-target-class_creation-doc_intf_name. '"LIF_DOC'.

DATA(ls_target) = is_control-target.

*   create the documents ("code text") of the local interface
    cs_class_definition-t_classrel_loc_def = create_lif_doc( is_target           = ls_target
                                    is_lif_definition       = ls_interface_definition ).

*   create the documents ("code text") of the local class
    cs_class_definition-t_local_def_imp   = create_lcl_doc( is_target            = ls_target
                                    it_doc_function_modules  = it_doc_function_modules
                                    is_lif_definition        = ls_interface_definition ).

*Fill inst attribute
    APPEND VALUE #( clsname = is_control-target-class_name
            cmpname = is_control-target-class_creation-doc_instance_name '"MO_DOC'
            exposure = seoc_exposure_private
            state =  seoc_state_implemented
            attdecltyp = seoo_attdecltyp_data
            typtype = seoo_typtype_ref_to
            type = is_control-target-class_creation-doc_intf_name '"LIF_DOC'
            ) TO cs_class_definition-t_attributes.

* now we need to change constructor implementation
    READ TABLE cs_class_definition-t_method_sources ASSIGNING FIELD-SYMBOL(<method_source>) WITH KEY
      cpdname = 'CONSTRUCTOR'.
    IF sy-subrc IS INITIAL.
      lv_source = 'me->' && is_control-target-class_creation-doc_instance_name && ` ` &&
          '= new' && ` ` && is_control-target-class_creation-doc_class_name && '( )' && '.'.
      APPEND lv_source TO <method_source>-source.
    ENDIF.

MESSAGE i006(zjg_ase_refact) INTO DATA(ls_msg).
    mo_logging->add_message( ).

ENDMETHOD.
```

FIG. 12A

```
* <SIGNATURE>---------------------------------------------------------------------------------+
* | Instance Private Method ZJG_ASE_REFACT_CL_CONVERT_ABS->CREATE_LCL_DOC         1206
* +-----------------------------------------------------------------------------------+
* | [--->] IT_DOC_FUNCTION_MODULES     TYPE     ZJG_ASE_REFACT_IF_COMMON_TYPES=>
*        TS_FUGR_DEFINITION-FUNCTION_MODULES
* | [--->] IS_LIF_DEFINITION           TYPE     ZJG_ASE_REFACT_IF_COMMON_TYPES=>TS_INTERFACE_DEF
* | [--->] IS_TARGET                   TYPE     ZJG_ASE_REFACT_IF_COMMON_TYPES=>TS_TARGET
* | [<-()] RT_LCL_DOC_SOURCE           TYPE     RSWSOURCET
* +------------------------------------------------------------------------------</SIGNATURE>
  METHOD create_lcl_doc.
   DATA lt_lcl_doc_source LIKE rt_lcl_doc_source.
   DATA lv_source TYPE string.
   DATA lt_ntext TYPE STANDARD TABLE OF string WITH DEFAULT KEY.

CONCATENATE 'class' is_target-class_creation-doc_class_name 'definition.' INTO lv_source SEPARATED BY space IN
     CHARACTER MODE.
   APPEND lv_source TO lt_lcl_doc_source.
   APPEND 'PUBLIC SECTION.' TO lt_lcl_doc_source.
   CLEAR lv_source.
   CONCATENATE 'interfaces' is_target-class_creation-doc_intf_name '.' INTO lv_source SEPARATED BY space IN
     CHARACTER MODE.
   APPEND lv_source TO lt_lcl_doc_source.
   APPEND 'endclass.' TO lt_lcl_doc_source.

CLEAR lv_source.
   CONCATENATE 'class' is_target-class_creation-doc_class_name 'implementation.' INTO lv_source SEPARATED BY space IN
     CHARACTER MODE.
   APPEND lv_source TO lt_lcl_doc_source.

LOOP AT is_lif_definition-methods_definition-definition_header ASSIGNING FIELD-SYMBOL(<meth_def>).
     CLEAR lv_source.

READ TABLE it_doc_function_modules WITH KEY funcname = <meth_def>-cmpname ASSIGNING FIELD-SYMBOL(<fm_def>).

lv_source = 'METHOD' && ` ` && is_target-class_creation-doc_intf_name && '~' && <meth_def>-cmpname && '.'.
     APPEND lv_source TO lt_lcl_doc_source.
     CLEAR lv_source.
     lv_source = 'call function' && ` ` && '"' && <meth_def>-cmpname && '"'.         1200
     IF <fm_def>-func_intf-import IS INITIAL AND
        <fm_def>-func_intf-except IS INITIAL AND
        <fm_def>-func_intf-change IS INITIAL AND
        <fm_def>-func_intf-except IS INITIAL AND
        <fm_def>-func_intf-except IS INITIAL.
       lv_source = lv_source && '.'.
       APPEND lv_source TO lt_lcl_doc_source.
     ELSE.
       APPEND lv_source TO lt_lcl_doc_source.

IF <fm_def>-func_intf-import IS NOT INITIAL.
       APPEND 'exporting' TO lt_lcl_doc_source.
     ENDIF.
     LOOP AT <fm_def>-func_intf-import ASSIGNING FIELD-SYMBOL(<frparam>).
       lv_source = <frparam>-parameter && ` ` && '=' && ` ` && <frparam>-parameter.
       APPEND lv_source TO lt_lcl_doc_source.
     ENDLOOP.

IF <fm_def>-func_intf-export IS NOT INITIAL.
       APPEND 'importing' TO lt_lcl_doc_source.
     ENDIF.
     LOOP AT <fm_def>-func_intf-export ASSIGNING <frparam>.
       lv_source = <frparam>-parameter && ` ` && '=' && ` ` && <frparam>-parameter.
       APPEND lv_source TO lt_lcl_doc_source.
     ENDLOOP.

IF <fm_def>-func_intf-tables IS NOT INITIAL.
       APPEND 'TABLES' TO lt_lcl_doc_source.
     ENDIF.
     LOOP AT <fm_def>-func_intf-tables ASSIGNING <frparam>.
       lv_source = <frparam>-parameter && ` ` && '=' && ` ` && <frparam>-parameter.
       APPEND lv_source TO lt_lcl_doc_source.
     ENDLOOP.
```

FIG. 12B

```
IF <fm_def>-func_intf-change IS NOT INITIAL.
    APPEND 'changing' TO lt_lcl_doc_source.                                  1200
ENDIF.
LOOP AT <fm_def>-func_intf-change ASSIGNING <frparam>.
    lv_source = <frparam>-parameter && ` ` && '=' && ` ` && <frparam>-parameter.
    APPEND lv_source TO lt_lcl_doc_source.
ENDLOOP.

IF <fm_def>-func_intf-except IS NOT INITIAL.
    APPEND 'exceptions' TO lt_lcl_doc_source.
    LOOP AT <fm_def>-func_intf-except ASSIGNING <frparam>.
        lv_source = sy-tabix.
        lv_source = <frparam>-parameter && ` ` && '=' && ` ` && lv_source.
        APPEND lv_source TO lt_lcl_doc_source.                               1206
    ENDLOOP.
    lv_source = 'OTHERS =' && ` `.
    DATA(lv_subrc) = sy-subrc.
    lv_subrc = lines( <fm_def>-func_intf-except ) + 1.
    lv_source = lv_source && lv_subrc.
    APPEND lv_source TO lt_lcl_doc_source.
    lv_source = '.'.
    APPEND lv_source TO lt_lcl_doc_source.
    IF is_target-class_creation-convert_excep = abap_true.
        APPEND 'CASE SY-SUBRC.' TO lt_lcl_doc_source.
        LOOP AT <fm_def>-func_intf-except ASSIGNING <frparam>.
            APPEND 'WHEN' && ` ` && sy-tabix && '.' TO lt_lcl_doc_source.
            APPEND 'RAISE EXCEPTION TYPE' && ` ` && is_target-cx_name TO lt_lcl_doc_source.
            APPEND 'EXPORTING' TO lt_lcl_doc_source.
            APPEND 'FORMER_EXCEPTION =' && ` ` && `'` && <frparam>-parameter && `'` && '.' TO lt_lcl_doc_source.
        ENDLOOP.
        APPEND 'WHEN OTHERS.' TO lt_lcl_doc_source.
        APPEND 'RAISE EXCEPTION TYPE' && ` ` && is_target-cx_name TO lt_lcl_doc_source.
        APPEND 'EXPORTING' TO lt_lcl_doc_source.
        APPEND 'FORMER_EXCEPTION =' && ` ` && '"OTHERS"' && '.' TO lt_lcl_doc_source.
        APPEND 'ENDCASE.' TO lt_lcl_doc_source.
    ENDIF.
    ELSE.
        APPEND '.' TO lt_lcl_doc_source.
    ENDIF.
ENDIF.
APPEND 'ENDMETHOD.' TO lt_lcl_doc_source.

MESSAGE i018(zjg_ase_refact) WITH <meth_def>-cmpname is_target-class_creation-doc_class_name <meth_def>-cmpname
    INTO DATA(ls_msg).
mo_logging->add_message( ).
ENDLOOP.
APPEND 'endclass.' TO lt_lcl_doc_source.

CLEAR lt_ntext.

CALL FUNCTION 'PRETTY_PRINTER'
    EXPORTING
        inctoo = abap_false
    TABLES
        otext = lt_lcl_doc_source
        ntext = lt_ntext.

rt_lcl_doc_source = lt_ntext.
ENDMETHOD.
```

FIG. 12C

```
* <SIGNATURE>------------------------------------------------------------------------------+
* | Instance Private Method ZJG_ASE_REFACT_CL_CONVERT_ABS->CREATE_LIF_DOC
* +------------------------------------------------------------------------------+
* | [--->] IS_LIF_DEFINITION      TYPE    ZJG_ASE_REFACT_IF_COMMON_TYPES=>TS_INTERFACE_DEF
* | [--->] IS_TARGET              TYPE    ZJG_ASE_REFACT_IF_COMMON_TYPES=>TS_TARGET
* | [<-()] RT_LIF_DOC_SOURCE      TYPE    RSWSOURCET                                          1200
* +------------------------------------------------------------------------</SIGNATURE>
 METHOD create_lif_doc.
  DATA lt_lif_doc_source LIKE rt_lif_doc_source.
  DATA lv_source TYPE string.
  DATA lt_params TYPE zjg_ase_refact_if_common_types=>ts_interface_def-methods_definition-params.
  DATA lt_except TYPE zjg_ase_refact_if_common_types=>ts_interface_def-methods_definition-exceps.
  DATA lt_ntext TYPE STANDARD TABLE OF string WITH DEFAULT KEY.

lv_source = 'interface' && ` ` && is_target-class_creation-doc_intf_name && '.'.
  APPEND lv_source TO lt_lif_doc_source.                                                      1210
  LOOP AT is_lif_definition-types ASSIGNING FIELD-SYMBOL(<type>).
    lv_source = 'TYPES' && ` ` && <type>-typesrc && '.'.
    APPEND lv_source TO lt_lif_doc_source.
  ENDLOOP.
  LOOP AT is_lif_definition-methods_definition-definition_header ASSIGNING FIELD-SYMBOL(<meth_def>).
    CLEAR lv_source.
    CLEAR lt_params.
    CLEAR lt_except.
    lt_params = VALUE #( FOR ls IN is_lif_definition-methods_definition-params WHERE ( cmpname = <meth_def>-cmpname )
                                      ( CORRESPONDING #( ls ) ) ).
    lt_except = VALUE #( FOR ls1 IN is_lif_definition-methods_definition-exceps WHERE ( cmpname = <meth_def>-cmpname )
                                      ( CORRESPONDING #( ls1 ) ) ).
    lv_source = 'METHODS' && ` ` && <meth_def>-cmpname.
    IF lt_params IS NOT INITIAL OR lt_except IS NOT INITIAL.
      APPEND lv_source TO lt_lif_doc_source.
      CLEAR lv_source.
      CLEAR lt_params.
      lt_params = VALUE #( FOR ls IN is_lif_definition-methods_definition-params WHERE ( cmpname = <meth_def>-cmpname
                                          AND pardecltyp = seos_pardecltyp_importing )
                                      ( CORRESPONDING #( ls ) ) ).
      IF lt_params IS NOT INITIAL.
        APPEND ' importing' TO lt_lif_doc_source.
        LOOP AT lt_params ASSIGNING FIELD-SYMBOL(<param>).
          CLEAR lv_source.
          lv_source = <param>-sconame.
          CASE <param>-typtype.
            WHEN seoo_typtype_type.
              lv_source = lv_source && ` ` && 'TYPE' && ` ` && <param>-type.
            WHEN seoo_typtype_like.
              lv_source = lv_source && ` ` && 'LIKE' && ` ` && <param>-type.
            WHEN seoo_typtype_ref_to.
              lv_source = lv_source && ` ` && 'TYPE REF TO' && ` ` && <param>-type.
          ENDCASE.
          IF <param>-paroptionl = abap_true.
            IF <param>-parvalue IS INITIAL.
              lv_source = lv_source && ` ` && 'optional'.
            ELSE.
              lv_source = lv_source && ` ` && 'default' && ` ` && '' && <param>-parvalue && ''.
            ENDIF.
          ENDIF.
          APPEND lv_source TO lt_lif_doc_source.
        ENDLOOP.
      ENDIF.
```

FIG. 12D

```
CLEAR lt_params.
  lt_params = VALUE #( FOR ls IN is_lif_definition-methods_definition-params WHERE ( cmpname = <meth_def>-cmpname AND
                                                                                       pardecltyp = seos_pardecltyp_exporting )
                                       ( CORRESPONDING #( ls ) ) ).
  IF lt_params IS NOT INITIAL.
    APPEND ' exporting' TO lt_lif_doc_source.
    LOOP AT lt_params ASSIGNING <param>.
      CLEAR lv_source.
      lv_source = <param>-sconame.
      CASE <param>-typtype.
        WHEN seoo_typtype_type.
          lv_source = lv_source && ` ` && 'TYPE' && ` ` && <param>-type.
        WHEN seoo_typtype_like.
          lv_source = lv_source && ` ` && 'LIKE' && ` ` && <param>-type.
        WHEN seoo_typtype_ref_to.
          lv_source = lv_source && ` ` && 'TYPE REF TO' && ` ` && <param>-type.
      ENDCASE.

APPEND lv_source TO lt_lif_doc_source.
    ENDLOOP.
  ENDIF.

CLEAR lt_params.
  lt_params = VALUE #( FOR ls IN is_lif_definition-methods_definition-params WHERE ( cmpname = <meth_def>-cmpname AND
                                                                                       pardecltyp = seos_pardecltyp_changing )
                                       ( CORRESPONDING #( ls ) ) ).
  IF lt_params IS NOT INITIAL.
    APPEND ' changing' TO lt_lif_doc_source.
    LOOP AT lt_params ASSIGNING <param>.
      CLEAR lv_source.
      lv_source = <param>-sconame.
      CASE <param>-typtype.
        WHEN seoo_typtype_type.
          lv_source = lv_source && ` ` && 'TYPE' && ` ` && <param>-type.
        WHEN seoo_typtype_like.
          lv_source = lv_source && ` ` && 'LIKE' && ` ` && <param>-type.
        WHEN seoo_typtype_ref_to.
          lv_source = lv_source && ` ` && 'TYPE REF TO' && ` ` && <param>-type.
      ENDCASE.
      APPEND lv_source TO lt_lif_doc_source.
    ENDLOOP.
  ENDIF.

IF lt_except IS NOT INITIAL.
    IF is_target-class_creation-convert_excep = abap_false.
      APPEND 'EXCEPTIONS' TO lt_lif_doc_source.
      LOOP AT lt_except ASSIGNING FIELD-SYMBOL(<exception>).
        APPEND <exception>-sconame TO lt_lif_doc_source.
      ENDLOOP.
      APPEND '.' TO lt_lif_doc_source.
    ELSE.
      APPEND 'RAISING' TO lt_lif_doc_source.
      APPEND is_target-cx_name TO lt_lif_doc_source.
      APPEND '.' TO lt_lif_doc_source.
    ENDIF.
  ELSE.
    APPEND '.' TO lt_lif_doc_source.
  ENDIF.
ELSE.
  lv_source = lv_source && ` ` && '.'.
  APPEND lv_source TO lt_lif_doc_source.
ENDIF.
ENDLOOP.
APPEND 'endinterface.' TO lt_lif_doc_source.

CALL FUNCTION 'PRETTY_PRINTER'
  EXPORTING
    inctoo = abap_false
  TABLES
    otext = lt_lif_doc_source
    ntext = lt_ntext.

rt_lif_doc_source = lt_ntext.
CLEAR lt_ntext.
ENDMETHOD.
```

FIG. 12E

```
* <SIGNATURE>--------------------------------------------------------------------------------+
* | Instance Public Method ZJG_ASE_REFACT_CL_CONVERT_ABS->
    ZJG_ASE_REFACT_IF_CONVERTER~CONVERT_FM_DEF_TO_INTF_DEF
* +--------------------------------------------------------------------------------+
* | [--->] IT_FUNCTION_MODULES_DEF    TYPE    ZJG_ASE_REFACT_IF_COMMON_TYPES=>
    TS_FUGR_DEFINITION-FUNCTION_MODULES
* | [--->] IS_TARGET                  TYPE    TS_TARGET
* | [--->] IV_INTF_NAME               TYPE    SEOCLSNAME(optional)
* | [<-()] RS_INTF_DEF                TYPE    ZJG_ASE_REFACT_IF_COMMON_TYPES=>TS_INTERFACE_DEF
* | [!CX!] ZCX_ASE_REFACT
* +--------------------------------------------------------------------------</SIGNATURE>
  METHOD zjg_ase_refact_if_converter~convert_fm_def_to_intf_def.

DATA lv_paramt TYPE paramtext.
    DATA lv_typtype TYPE seotype-typtype.
    DATA lv_pardecltyp TYPE seosubcodf-pardecltyp.
    DATA lt_params TYPE rsfb_para.
    DATA ls_excep TYPE LINE OF rsfb_para.
    DATA lv_parpasstype TYPE seosubcodf-parpasstyp.
    DATA lv_paroptionl TYPE seooptionl.
    DATA lv_partype TYPE rs38l_typ.
    DATA lv_src TYPE c LENGTH 999.
    DATA lv_method_name TYPE seocmpname.
    DATA lv_interface_name TYPE seoclsname.

DATA ls_methods_definition TYPE zjg_ase_refact_if_common_types=>ts_interface_def-methods_definition.
    DATA lt_types_definition   TYPE zjg_ase_refact_if_common_types=>ts_interface_def-types.

IF iv_intf_name IS INITIAL.
      lv_interface_name = is_target-interface_name.
    ELSE.
      lv_interface_name = iv_intf_name.
    ENDIF.

LOOP AT it_function_modules_def ASSIGNING FIELD-SYMBOL(<func>).
      CLEAR lv_method_name.
      READ TABLE is_target-method_names WITH KEY fm_name = <func>-funcname ASSIGNING FIELD-SYMBOL(<meth_name>).
      IF sy-subrc IS INITIAL.
        lv_method_name = <meth_name>-method_name.
      ENDIF.
      IF lv_method_name IS INITIAL.
        lv_method_name = <func>-funcname.
      ENDIF.
      APPEND VALUE #( clsname = lv_interface_name
              cmpname = lv_method_name
              langu = is_target-dev_language
              descript = <func>-func_text
              state = seoc_state_implemented
              exposure = seoc_exposure_public
              mtddecltyp = seoo_mtddecltyp_method
              ) TO ls_methods_definition-definition_header.

CLEAR lt_params.

APPEND LINES OF <func>-func_intf-import TO lt_params.
      APPEND LINES OF <func>-func_intf-export TO lt_params.
      APPEND LINES OF <func>-func_intf-change TO lt_params.
      APPEND LINES OF <func>-func_intf-tables TO lt_params.

IF are_parameters_convertible( it_parameters = lt_params iv_function_name = <func>-funcname ) = abap_false.
        CONTINUE.
      ENDIF.

IF is_target-class_creation-convert_excep = abap_false.
        APPEND LINES OF <func>-func_intf-except TO lt_params.
      ELSE.
        READ TABLE <func>-func_intf-except INDEX 1 INTO ls_excep.
        IF sy-subrc IS INITIAL.
          APPEND ls_excep TO lt_params.
        ENDIF.
      ENDIF.
```

```
LOOP AT lt_params ASSIGNING FIELD-SYMBOL(<param>).

CLEAR: lv_typtype, lv_paramt, lv_pardecltyp, lv_paroptionl, lv_parpasstype, lv_partype.

IF <param>-typefield IS INITIAL AND <param>-paramtype <> 'X'.
      <param>-typefield = 'TYPE'.
      <param>-structure = 'ANY'.
    ENDIF.

READ TABLE <func>-func_intf-paramtext ASSIGNING FIELD-SYMBOL(<paramt>) WITH KEY parameter = <param>-parameter.
    IF sy-subrc IS INITIAL.
      lv_paramt = <paramt>-stext.
    ELSE.
      lv_paramt = <param>-parameter.
    ENDIF.                                                                              1200

CASE <param>-typefield.
      WHEN 'TYPE'.
        lv_typtype = seoo_typtype_type.
      WHEN 'LIKE'.
        lv_typtype = seoo_typtype_type.   " ABAP-OO request 'TYPE' if referring to DDIC.
      WHEN 'TYPE REF TO'.
        lv_typtype = seoo_typtype_ref_to.
    ENDCASE.

CASE <param>-paramtype.                           1214
      WHEN 'I'.
        lv_pardecltyp = seos_pardecltyp_importing.
      WHEN 'E'.
        lv_pardecltyp = seos_pardecltyp_exporting.
      WHEN 'C' OR 'T'.
        lv_pardecltyp = seos_pardecltyp_changing.
    ENDCASE.

IF <param>-value = abap_true.
      lv_parpasstype = seos_parpasstyp_byvalue.
    ELSE.
      lv_parpasstype = seos_parpasstyp_byreference.
    ENDIF.

IF <param>-optional = abap_true.
      lv_paroptionl = abap_true.
    ELSE.
      lv_paroptionl = abap_false.
    ENDIF.

lv_partype = <param>-structure.

* create table type in interface for usage in former tables parameters, now changing parameter.
    IF <param>-paramtype = 'T'.
      CASE <param>-structure.
        WHEN 'TABLE'.
          lv_partype = 'ANY TABLE'.
        WHEN 'ANY' OR 'STANDARD TABLE'.
          lv_partype = 'STANDARD TABLE'.
        WHEN OTHERS.
          CLEAR lv_src.
          DATA lv_partype_30 TYPE c LENGTH 30.
          lv_partype_30 = 'TT_' && <param>-structure.
          lv_partype = lv_partype_30.
          lv_src = lv_partype_30.
          CONCATENATE lv_src 'type standard table of' <param>-structure 'with default key' INTO lv_src SEPARATED BY space IN
            CHARACTER MODE.
```

FIG. 12G

```
READ TABLE lt_types_definition WITH KEY clsname = lv_interface_name cmpname =
  lv_partype_30 ASSIGNING FIELD-SYMBOL(<types_def>).
    IF sy-subrc IS NOT INITIAL.
      lv_typtype = seoo_typtype_type.
      APPEND VALUE #( clsname = lv_interface_name
               cmpname = lv_partype_30
               state =  seoc_state_implemented
               exposure = seoc_exposure_public
               typtype = seoo_typtype_others
               typesrc = lv_src
               ) TO lt_types_definition.
    ELSE.
*      check if content is also equal
      IF lv_src <> <types_def>-typesrc.
        MESSAGE ID 'ZJG_ASE_REFACT' TYPE 'E' NUMBER 010 WITH <param>-structure.
      ENDIF.
    ENDIF.
  ENDCASE.
ENDIF.

CASE <param>-paramtype.
  WHEN 'X'.
    IF <func>-func_intf-class_based_exceptions = abap_false.
      IF is_target-class_creation-convert_excep = abap_false.
        APPEND VALUE #( clsname = lv_interface_name
                 cmpname =  lv_method_name
                 sconame = <param>-parameter
                 langu = is_target-dev_language
                 descript = lv_paramt
                 is_resumable = <param>-is_resumable
                 ) TO  ls_methods_definition-exceps.
      ELSE.
        APPEND VALUE #( clsname = lv_interface_name
                 cmpname =  lv_method_name
                 sconame = is_target-cx_name
                 ) TO  ls_methods_definition-exceps.

READ TABLE ls_methods_definition-definition_header ASSIGNING FIELD-SYMBOL(<header>)
            WITH KEY clsname = lv_interface_name cmpname = lv_method_name.
        IF sy-subrc IS INITIAL.
          <header>-mtdnewexc = abap_true.
        ENDIF.
      ENDIF.
    ELSE.
      APPEND VALUE #( clsname = lv_interface_name
               cmpname = lv_method_name
               sconame = <param>-parameter
               langu = is_target-dev_language
               descript = lv_paramt
               is_resumable = <param>-is_resumable
               ) TO  ls_methods_definition-exceps.

READ TABLE ls_methods_definition-definition_header ASSIGNING <header>
          WITH KEY clsname = lv_interface_name cmpname = lv_method_name.
      IF sy-subrc IS INITIAL.
        <header>-mtdnewexc = abap_true.
      ENDIF.
    ENDIF.
  WHEN OTHERS.
```

FIG. 12H

```
* <SIGNATURE>----------------------------------------------------------------------------------+
* | Instance Public Method ZJG_ASE_REFACT_CL_CONVERT_ABS->
    ZJG_ASE_REFACT_IF_CONVERTER~CREATE_CLASS_DEFINITION
* +---------------------------------------------------------------------------------------------+
* | [--->] IS_FG_DEFINITION         TYPE     ZJG_ASE_REFACT_IF_COMMON_TYPES=>TS_FUGR_DEFINITION
* | [<-()] RS_CLASS_DEFINITION      TYPE     ZJG_ASE_REFACT_IF_COMMON_TYPES=>TS_CLASS_DEF
* | [!CX!] ZCX_ASE_REFACT
* +-------------------------------------------------------------------------</SIGNATURE>
                                                                                            —1218
  METHOD zjg_ase_refact_if_converter~create_class_definition.
    DATA ls_class_definition TYPE zjg_ase_refact_if_common_types=>ts_class_def.
    IF ms_control-target-class_creation-create_class IS INITIAL.
      RETURN.
    ENDIF.

me->zjg_ase_refact_if_converter~create_intf_definition( is_fg_definition ).                1200 me->create_singleton( EXPORTING is_target        = ms_control-target
                          CHANGING  cs_class_definition = ls_class_definition ).

ls_class_definition-class_header = me->set_class_header( is_target       = ms_control-target
                                   is_fg_definition = is_fg_definition ).

APPEND LINES OF me->create_attribs_from_vars( iv_class_name    = ms_control-target-class_name
                                  iv_create_attribs  = ms_control-target-class_creation-create_attribs
                                  it_global_variables = is_fg_definition-global_variables )
                 TO ls_class_definition-t_attributes.

me->create_constructor( EXPORTING iv_class_name    = ms_control-target-class_name
                            CHANGING  cs_class_definition = ls_class_definition ).

ls_class_definition-methods_definition = me->create_meth_def_from_forms( is_target        = ms_control-target
                                   it_forms         = is_fg_definition-forms
                                   is_methods_definition = ls_class_definition-methods_definition ).

ls_class_definition-t_method_sources = me->add_form_meth_implement( it_forms  = is_fg_definition-forms
                                   is_target = ms_control-target
                                   it_existing_method_src = ls_class_definition-t_method_sources
                                   ).

ls_class_definition-types = me->add_form_types( it_forms  = is_fg_definition-forms
                                   it_types  = ls_class_definition-types
                                   is_target = ms_control-target
                                   ).

me->create_intf_implement( EXPORTING is_target = ms_control-target
                               it_function_modules = is_fg_definition-function_modules
                               CHANGING  cs_class_definition = ls_class_definition ).

me->create_doc_for_decoupling( EXPORTING is_control        = ms_control
                                   it_doc_function_modules = is_fg_definition-doc_function_modules
                                   CHANGING  cs_class_definition = ls_class_definition ).

ls_class_definition-t_macro_def = me->copy_used_macros( it_macros = is_fg_definition-macros ).

ls_class_definition-t_abap_unit_code = me->generate_au( is_control_target = ms_control-target
                                   it_au_source     = is_fg_definition-aunit-source ).

ls_class_definition-t_method_sources = me->replace_calls( is_target        = ms_control-target
                                   it_method_params  = ls_class_definition-methods_definition-params
                                   it_method_sources = ls_class_definition-t_method_sources
                                   is_fg_definition  = is_fg_definition
                                   is_interface_definition = ms_objects-interface-definition ).

me->create_warnings_missing_conv( is_fg_definition ).

ms_objects-class-definition = ls_class_definition.
    ms_objects-class-status = con_status_defined.
    rs_class_definition = ls_class_definition.

ENDMETHOD.
ENDCLASS.
```

FIG. 12J

```
CLASS zjg_ase_refact_cl_code_ad_abs DEFINITION
 PUBLIC
 ABSTRACT
 CREATE PUBLIC .
                                          1254
 PUBLIC SECTION.

INTERFACES zjg_ase_refact_if_code_adapt .

PROTECTED SECTION.                                                    1250

DATA mo_logging TYPE REF TO zjg_ase_refact_if_logging .

PRIVATE SECTION.

types:
  tt_tokens    TYPE STANDARD TABLE OF stokesx WITH DEFAULT KEY .
 types:
  tt_statements TYPE STANDARD TABLE OF sstmnt  ##NEEDED.
 types:
  begin of ts_param_triple,
        param TYPE string,
        op   TYPE string,
        val  TYPE string,
      END OF ts_param_triple .
 types:
  begin of ts_param_def_line,
        triples type standard table of ts_param_triple WITH DEFAULT KEY,
        code   TYPE rswsourcet,
      end of ts_param_def_line .
 types:
  BEGIN OF ts_meth_code_params,
    importing TYPE ts_param_def_line,
    exporting TYPE ts_param_def_line,
    changing  TYPE ts_param_def_line,
    exception TYPE ts_param_def_line,
  END OF ts_meth_code_params .

class-data SO_INSTANCE type ref to ZJG_ASE_REFACT_CL_CODE_AD_ABS .

methods GET_METH_PARAMS_AS_CODE
   importing
     !IT_ACTIVE_TOKENS type TT_TOKENS
   returning
     value(RS_PARAMS) type TS_METH_CODE_PARAMS .
 methods CREATE_DOC_METH_CODE
   importing
     !IV_FULL_METH_NAME type ZJG_ASE_REFACT_IF_CODE_ADAPT=>TY_CALL_METHOD_NAME
     !IS_PARAMS_AS_CODE type ZJG_ASE_REFACT_CL_CODE_AD_ABS=>TS_METH_CODE_PARAMS
     !IV_FM_NAME type RS38L_FNAM
     !IV_METH_REPLACE_IN type SEOCPDNAME
     !IV_CX_NAME type SEOCLSNAME
   returning
     value(RT_METHOD_CODE) type RSWSOURCET .

ENDCLASS.
```

FIG. 12K

```
CLASS ZJG_ASE_REFACT_CL_CODE_AD_ABS IMPLEMENTATION.

* <SIGNATURE>---------------------------------------------------------------------------------------+
* | Instance Private Method ZJG_ASE_REFACT_CL_CODE_AD_ABS->CREATE_DOC_METH_CODE
* +--------------------------------------------------------------------------------------+
* | [--->] IV_FULL_METH_NAME        TYPE    ZJG_ASE_REFACT_IF_CODE_ADAPT=>TY_CALL_METHOD_NAME
* | [--->] IS_PARAMS_AS_CODE        TYPE    ZJG_ASE_REFACT_CL_CODE_AD_ABS=>TS_METH_CODE_PARAMS
* | [--->] IV_FM_NAME             TYPE    RS38L_FNAM
* | [--->] IV_METH_REPLACE_IN      TYPE    SEOCPDNAME
* | [--->] IV_CX_NAME             TYPE    SEOCLSNAME
* | [<-()] RT_METHOD_CODE         TYPE    RSWSOURCET
* +--------------------------------------------------------------------------------------</SIGNATURE>
METHOD create_doc_meth_code.
  DATA: lv_meth_name TYPE string,
        lv_ref_name  TYPE string.
  CLEAR rt_method_code.

SPLIT iv_full_meth_name AT '->' INTO TABLE DATA(lt_meth_name).

READ TABLE lt_meth_name INTO lv_ref_name INDEX 1.
  READ TABLE lt_meth_name INTO lv_meth_name INDEX 2.

MESSAGE i024(zjg_ase_refact) WITH iv_fm_name lv_meth_name lv_ref_name iv_meth_replace_in INTO DATA(ls_msg).
  mo_logging->add_message( ).

APPEND create_comment_line( ) TO rt_method_code.
  IF is_params_as_code-exception IS NOT INITIAL.
    APPEND 'TRY.' TO rt_method_code.
  ENDIF.
  IF is_params_as_code-changing IS INITIAL AND
     is_params_as_code-importing IS INITIAL AND
     is_params_as_code-exporting IS INITIAL.
    APPEND iv_full_meth_name && '( ).' TO rt_method_code.
  ELSE.
   APPEND iv_full_meth_name && '(' TO rt_method_code.
   IF is_params_as_code-exporting IS NOT INITIAL.
    APPEND 'exporting' TO rt_method_code.
    LOOP AT is_params_as_code-exporting-code ASSIGNING FIELD-SYMBOL(<param_code>).
     APPEND <param_code> TO rt_method_code.
    ENDLOOP.
   ENDIF.
   IF is_params_as_code-importing IS NOT INITIAL.
    APPEND 'importing' TO rt_method_code.
    LOOP AT is_params_as_code-importing-code ASSIGNING <param_code>.
     APPEND <param_code> TO rt_method_code.
    ENDLOOP.
   ENDIF.
   IF is_params_as_code-changing IS NOT INITIAL.
    APPEND 'changing' TO rt_method_code.
    LOOP AT is_params_as_code-changing-code ASSIGNING <param_code>.
     APPEND <param_code> TO rt_method_code.
    ENDLOOP.
   ENDIF.
   APPEND ').' TO rt_method_code.
  ENDIF.
  IF is_params_as_code-exception IS NOT INITIAL.
    APPEND 'catch' && ` ` && iv_cx_name && ` ` && 'into data(lx_error).' TO rt_method_code.
    APPEND 'case lx_error->former_exception.' TO rt_method_code.
    LOOP AT is_params_as_code-exception-triples ASSIGNING FIELD-SYMBOL(<triple>).
     APPEND 'when' && ` ` && '''' && <triple>-param && '''' && '.' TO rt_method_code.
     APPEND 'sy-subrc =' && ` ` && <triple>-val && '.' TO rt_method_code.
    ENDLOOP.
    APPEND 'endcase.' TO rt_method_code.
    APPEND 'endtry.' TO rt_method_code.
  ENDIF.
ENDMETHOD.
```

```
* <SIGNATURE>----------------------------------------------------------------------------------+
* | Instance Private Method ZJG_ASE_REFACT_CL_CODE_AD_ABS->GET_METH_PARAMS_AS_CODE
* +----------------------------------------------------------------------------------+
* | [--->] IT_ACTIVE_TOKENS         TYPE      TT_TOKENS
* | [<-()] RS_PARAMS                TYPE      TS_METH_CODE_PARAMS
* +----------------------------------------------------------------------------</SIGNATURE>
  METHOD get_meth_params_as_code.
    DATA: lv_line_of_exporting TYPE i,
          lv_line_of_importing TYPE i,
          lv_line_of_tables    TYPE i,
          lv_line_of_changing  TYPE i,
          lv_line_of_exception TYPE i.
    DATA lv_line_to TYPE i.
    DATA: BEGIN OF ls_param,
            param TYPE string,
            op    TYPE string,
            val   TYPE string,
          END OF ls_param.

DATA ls_param_line TYPE ts_param_def_line.

LOOP AT it_active_tokens ASSIGNING FIELD-SYMBOL(<token>).
      CASE <token>-str.
        WHEN 'EXPORTING'.
          lv_line_of_exporting = sy-tabix.
        WHEN 'IMPORTING'.
          lv_line_of_importing = sy-tabix.
        WHEN 'TABLES'.
          lv_line_of_tables = sy-tabix.
        WHEN 'CHANGING'.
          lv_line_of_changing = sy-tabix.
        WHEN 'EXCEPTIONS'.
          lv_line_of_exception = sy-tabix.
      ENDCASE.
    ENDLOOP.

IF lv_line_of_exporting IS NOT INITIAL.
      CLEAR ls_param_line.
      IF lv_line_of_importing IS NOT INITIAL.
        lv_line_to = lv_line_of_importing - 1.
      ELSEIF lv_line_of_tables IS NOT INITIAL.
        lv_line_to = lv_line_of_tables - 1.
      ELSEIF lv_line_of_changing IS NOT INITIAL.
        lv_line_to = lv_line_of_changing - 1.
      ELSEIF lv_line_of_exception IS NOT INITIAL.
        lv_line_to = lv_line_of_exception - 1.
      ELSE.
        lv_line_to = lines( it_active_tokens ).
      ENDIF.
      lv_line_to = nmax( val1 = lv_line_of_exporting + 1 val2 = lv_line_to ).
      LOOP AT it_active_tokens ASSIGNING <token> FROM lv_line_of_exporting + 1 TO lv_line_to.
        IF ls_param-param IS INITIAL.
          ls_param-param = <token>-str.
        ELSEIF
        ls_param-op IS INITIAL.
          ls_param-op = <token>-str.
        ELSE.
          ls_param-val = <token>-str.
          APPEND ls_param-param && ` ` && ls_param-op && ` ` && ls_param-val TO ls_param_line-code.
          APPEND ls_param TO ls_param_line-triples.
          CLEAR ls_param.
        ENDIF.

ENDLOOP.
      rs_params-exporting = ls_param_line.
    ENDIF.
```

```
IF lv_line_of_importing IS NOT INITIAL.
  CLEAR ls_param_line.
  IF lv_line_of_tables IS NOT INITIAL.
    lv_line_to = lv_line_of_tables - 1.
  ELSEIF lv_line_of_changing IS NOT INITIAL.
    lv_line_to = lv_line_of_changing - 1.
  ELSEIF lv_line_of_exception IS NOT INITIAL.
    lv_line_to = lv_line_of_exception - 1.
  ELSE.
    lv_line_to = lines( it_active_tokens ).
  ENDIF.
  lv_line_to = nmax( val1 = lv_line_of_importing + 1 val2 = lv_line_to ).
  LOOP AT it_active_tokens ASSIGNING <token> FROM lv_line_of_importing + 1 TO lv_line_to.
    IF ls_param-param IS INITIAL.
      ls_param-param = <token>-str.
    ELSEIF
    ls_param-op IS INITIAL.
      ls_param-op = <token>-str.
    ELSE.
      ls_param-val = <token>-str.
      APPEND ls_param-param && ` ` && ls_param-op && ` ` && ls_param-val TO ls_param_line-code.
      APPEND ls_param TO ls_param_line-triples.
      CLEAR ls_param.
    ENDIF.
  ENDLOOP.
  rs_params-importing = ls_param_line.
ENDIF.

IF lv_line_of_tables IS NOT INITIAL.
  CLEAR ls_param_line.
  IF lv_line_of_changing IS NOT INITIAL.
    lv_line_to = lv_line_of_changing - 1.
  ELSEIF lv_line_of_exception IS NOT INITIAL.
    lv_line_to = lv_line_of_exception - 1.
  ELSE.
    lv_line_to = lines( it_active_tokens ).
  ENDIF.
  lv_line_to = nmax( val1 = lv_line_of_tables + 1 val2 = lv_line_to ).
  LOOP AT it_active_tokens ASSIGNING <token> FROM lv_line_of_tables + 1 TO lv_line_to.
    IF ls_param-param IS INITIAL.
      ls_param-param = <token>-str.
    ELSEIF
    ls_param-op IS INITIAL.
      ls_param-op = <token>-str.
    ELSE.
      ls_param-val = <token>-str.
      APPEND ls_param-param && ` ` && ls_param-op && ` ` && ls_param-val TO ls_param_line-code.
      APPEND ls_param TO ls_param_line-triples.
      CLEAR ls_param.
    ENDIF.
  ENDLOOP.
  rs_params-changing = ls_param_line.
ENDIF.

IF lv_line_of_changing IS NOT INITIAL.
  CLEAR ls_param_line.
  IF lv_line_of_exception IS NOT INITIAL.
    lv_line_to = lv_line_of_exception - 1.
  ELSE.
    lv_line_to = lines( it_active_tokens ).
  ENDIF.
  lv_line_to = nmax( val1 = lv_line_of_changing + 1 val2 = lv_line_to ).
  LOOP AT it_active_tokens ASSIGNING <token> FROM lv_line_of_changing + 1 TO lv_line_to.
    IF ls_param-param IS INITIAL.
      ls_param-param = <token>-str.
    ELSEIF
    ls_param-op IS INITIAL.
      ls_param-op = <token>-str.
    ELSE.
      ls_param-val = <token>-str.
      APPEND ls_param-param && ` ` && ls_param-op && ` ` && ls_param-val TO ls_param_line-code.
      APPEND ls_param TO ls_param_line-triples.
      CLEAR ls_param.
    ENDIF.
  ENDLOOP.
```

FIG. 12N

```
IF rs_params-changing IS NOT INITIAL.
    APPEND LINES OF ls_param_line-triples TO rs_params-changing-triples.
    APPEND LINES OF ls_param_line-code TO rs_params-changing-code.
   ELSE.
    rs_params-changing = ls_param_line.
   ENDIF.
  ENDIF.

IF lv_line_of_exception IS NOT INITIAL.
   CLEAR ls_param_line.
   lv_line_to = lines( it_active_tokens ).
   LOOP AT it_active_tokens ASSIGNING <token> FROM lv_line_of_exception + 1 TO lv_line_to.
    IF ls_param-param IS INITIAL.
      ls_param-param = <token>-str.
    ELSEIF
    ls_param-op IS INITIAL.
      ls_param-op = <token>-str.
    ELSE.
      ls_param-val = <token>-str.
      APPEND ls_param-param && ` ` && ls_param-op && ` ` && ls_param-val TO ls_param_line-code.
      APPEND ls_param TO ls_param_line-triples.
      CLEAR ls_param.
    ENDIF.
   ENDLOOP.
   rs_params-exception = ls_param_line.
  ENDIF.

ENDMETHOD.
```

FIG. 12O

```
* <SIGNATURE>---------------------------------------------------------------------------+
* | Instance Public Method ZJG_ASE_REFACT_CL_CODE_AD_ABS->
*    ZJG_ASE_REFACT_IF_CODE_ADAPT~REPLACE_DOC_FM_CALLS_IN_CODE
* +-----------------------------------------------------------------------------------+
* | [--->] IT_METHOD_ASSIGNMENT      TYPE    TT_DOC_METHOD_ASSIGNMENT
* | [--->] IV_CX_NAME                TYPE    SEOCLSNAME
* | [<-->] CS_SOURCE                 TYPE    SEO_METHOD_SOURCE
* | [!CX!] ZCX_ASE_REFACT
* +----------------------------------------------------------------------</SIGNATURE>
  METHOD zjg_ase_refact_if_code_adapt~replace_doc_fm_calls_in_code.
   DATA lv_flag_change_done TYPE abap_bool.
   DATA lt_tokens TYPE tt_tokens.
   DATA lt_statements TYPE tt_statements.
   DATA lt_kw   TYPE scan_keywordset.
   DATA ls_params TYPE ts_meth_code_params.
   DATA lt_active_tokens TYPE tt_tokens.
   DATA lt_method_code TYPE rswsourcet.
   DATA lv_ext_fm_name(32) TYPE c.
   DATA lv_first_row TYPE i.
   DATA lv_last_row TYPE i.
   DATA lv_full_meth_name TYPE zjg_ase_refact_if_code_adapt=>ty_call_method_name.

APPEND 'CALL' TO lt_kw.

LOOP AT it_method_assignment ASSIGNING FIELD-SYMBOL(<meth_assign>).
    lv_ext_fm_name = '"' && <meth_assign>-fm_name && '"'.
    lv_full_meth_name = <meth_assign>-doc_classref_name && '->' && <meth_assign>-doc_method_name.
```

FIG. 12P

```
DO.
    CLEAR lv_flag_change_done.

SCAN ABAP-SOURCE cs_source-source                                 1250
      TOKENS    INTO lt_tokens
      STATEMENTS INTO lt_statements
      KEYWORDS   FROM lt_kw
      WITH ANALYSIS                                        1264
      WITHOUT TRMAC.
    LOOP AT lt_statements ASSIGNING FIELD-SYMBOL(<statement>).
      CLEAR lt_active_tokens.
      CLEAR lt_method_code.
      CLEAR ls_params.
      READ TABLE lt_tokens ASSIGNING FIELD-SYMBOL(<fm_statement>) INDEX <statement>-from + 2.

IF <fm_statement>-str = lv_ext_fm_name.
*       get parameters

APPEND LINES OF lt_tokens FROM <statement>-from TO <statement>-to TO lt_active_tokens.

IF replace_allowed( iv_fm_name = <meth_assign>-fm_name
                 it_active_tokens = lt_active_tokens ) = abap_false.
          CONTINUE.
        ENDIF.

ls_params    = get_meth_params_as_code( lt_active_tokens ).
        lt_method_code = create_doc_meth_code( EXPORTING iv_full_meth_name = lv_full_meth_name
                           iv_fm_name = <meth_assign>-fm_name
                           iv_cx_name = iv_cx_name
                           iv_meth_replace_in = cs_source-cpdname
                           is_params_as_code = ls_params ).

READ TABLE lt_tokens ASSIGNING FIELD-SYMBOL(<token>) INDEX <statement>-from.
        lv_first_row = <token>-row.
        READ TABLE lt_tokens ASSIGNING <token> INDEX <statement>-to.
        lv_last_row = <token>-row.

DELETE cs_source-source FROM lv_first_row TO lv_last_row.

INSERT LINES OF lt_method_code INTO cs_source-source INDEX lv_first_row .
        lv_flag_change_done = abap_true.
        EXIT.
      ENDIF.
    ENDLOOP.
    IF lv_flag_change_done = abap_false.
      EXIT.
    ENDIF.
   ENDDO.
  ENDLOOP.

ENDMETHOD.

ENDCLASS.
```

FIG. 12Q

AUTOMATIC SOURCE CODE REFACTORING

FIELD

The present disclosure generally relates to code refactoring. Particular embodiments relate to automatically refactoring code that calls a function or error handling code.

BACKGROUND

Software development is often such that new functionality is based at least in part on legacy code. Programming practices can vary between programmers and developers, and can change over time. For example, older code may have been written before object-oriented programming became prevalent, but newer code may use object oriented techniques.

Not only can programming practices change, but programming languages themselves can change over time. In at least some cases, a newer version of a programming language can be backwards compatible with code written in an older version of the programming language. Thus, newer code can be used in conjunction with older code, and the older code can still be compiled or interpreted. Use of older code can still be suboptimal, but it may not be feasible to rewrite older code. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for automatically refactoring code. In particular, disclosed technologies provide for automatically refactoring code that includes function calls, which can be to particular types of functions, such as external functions or functions that are not member functions of a class. For code to be refactored, an interface and a class are created. The class implements the interface. Method declarations corresponding to the function calls being refactored are added to the interface and the class. Code is added instantiating an object of the class. Implementations for the methods in the class can call the functions called by the source code being refactored, or can include code implementing the functionality of the called functions. Refactored code has function calls replaced with calls to corresponding methods of the interface.

In one aspect, a method is provided of refactoring source code. Source code to be refactored is received. For example, source code can be sent as part of a call to a refactoring service, or can be retrieved from a file or repository, including based on identifiers provided by a user. The source code includes one or more function calls. Identifiers of at least one function call of the one or more of the function calls are received. In an implementation, the operations can include scanning the source code to be refactored, such as for key words that indicate that a function call matches a particular type (such as to a function module or other external function). In another implementation, the results of such scanning are provided.

Source code is automatically generated that defines an interface. Source code defining a class that implements the interface is automatically generated. A first method declaration for the at least one function call of the one or more function calls are added to the interface. A second method declaration for the at least one function call is added to the class. A method implementation for the at least one of the one or more function calls is added to the class.

Refactored source code is automatically generated. The refactored source code has the at least one function call replaced with a call to a corresponding method of the interface.

In another aspect, a method is provided for refactoring source code that includes error handling code. Source code to be refactored is received. The source code includes one or more function implementations (which can be methods of a class, or other types of functions). Error handling source code is identified in at least one of the one or more function implementations. A numeric error code defined for an error handled by the error handling source code is determined. Refactored source code is generated, the refactored source code adding error handling source code outputting a textual description of an error associated with the numeric error code.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 6 is a diagram illustrating different ways of implementing a class method that implements an interface method called by refactored code.

FIG. 7 is example pseudocode for code refactoring using disclosed technologies.

FIG. 9 is example ABAP code for an example class and an example interface that can be used with code produced by refactoring the code of FIG. 8.

FIG. 10 is example ABAP code for generating an instance of the class of FIG. 9.

FIG. 11 is example refactored ABAP code produced using disclosed technologies from the code of FIG. 8.

DETAILED DESCRIPTION

Example 1—Overview

Figure 1:
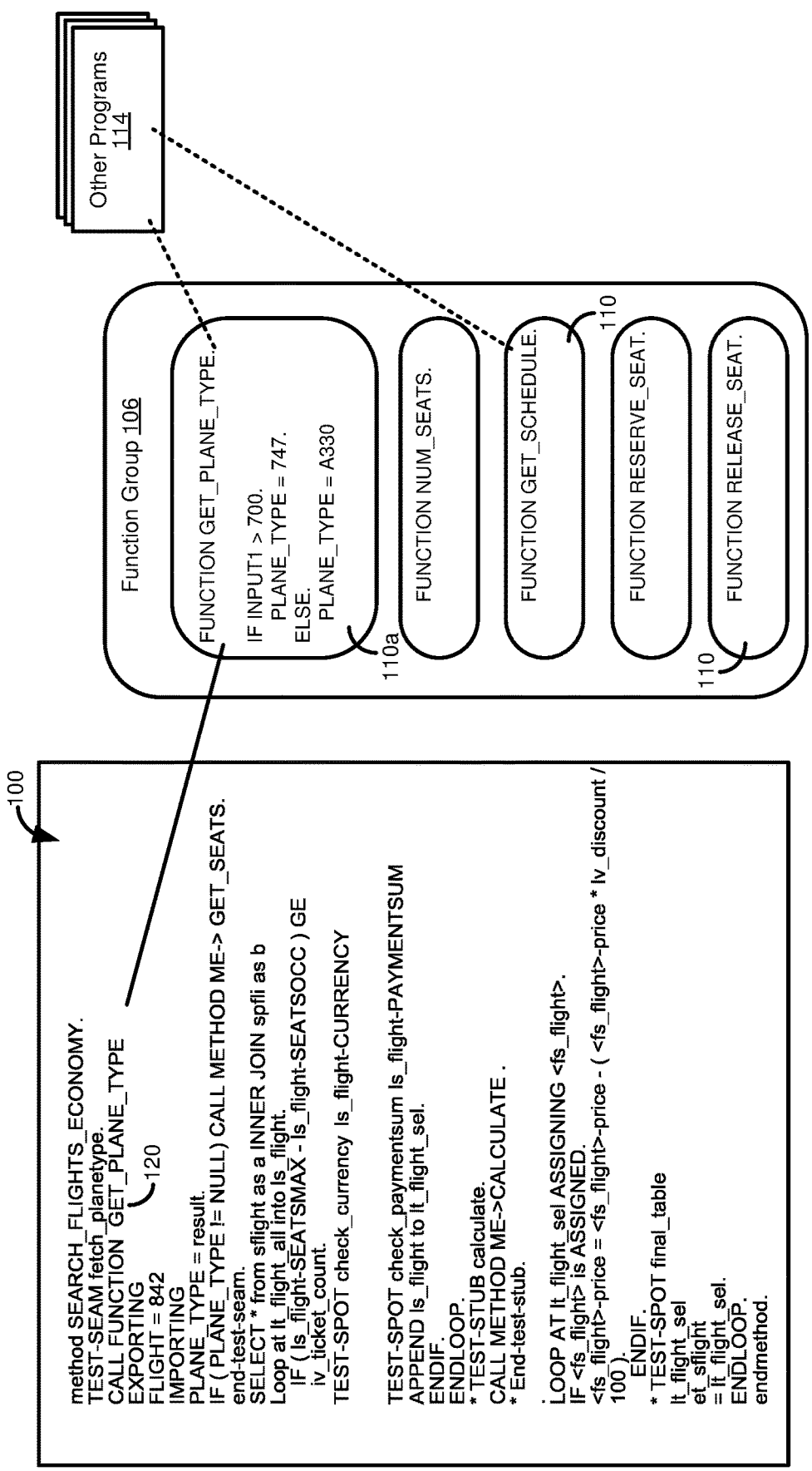
FIG. 1 is a diagram illustrating how code to be refactored can include procedural function calls, including calls to external functions.

Software development is often such that new functionality is based at least in part on legacy code. Programming practices can vary between programmers and developers, and can change over time. For example, older code may have been written before object-oriented programming became prevalent, but newer code may use object-oriented techniques.

Not only can programming practices change, but programming languages themselves can change over time. In at least some cases, a newer version of a programming language can be backwards compatible with code written in an older version of the programming language. Thus, newer code can be used in conjunction with older code, and the older code can still be compiled or interpreted. Use of older code can still be suboptimal, but it may not be feasible to rewrite older code. Accordingly, room for improvement exists.

As an example, the Advanced Business Application Programming Language (ABAP) was introduced in 1983. In ABAP, external function modules can be created that can be called by other code. Function modules related to a particular functional or subject matter area can be grouped into function groups. In 1999, ABAP Objects were introduced, which added object-oriented programming to ABAP. In particular, ABAP Objects provides object oriented programming artifacts such as classes and interfaces, including supporting polymorphism and inheritance. Thus, with the introduction of ABAP Objects, ABAP programmers could program in an object oriented style similar to languages such as C++ and JAVA.

An advantage of ABAP is that ABAP Objects is fully integrated into the prior ABAP programming language. So, older code can continue to be used, including having existing function modules be called by ABAP code, including ABAP code that implements objects. However, a number of problems can result from continued use of legacy code. Code that calls a function module is typically hardcoded into a particular program. It can be difficult to test such code. For example, the function module may be being used by executing production software, and thus changing the function module for testing purposes could cause issues with other programs that use the function module.

In addition, it may be difficult for programmers to read older code. In particular, newer developers may be more used to object-oriented programming styles. It may require more work to train such developers to recognize older programming patterns, or learn programming concepts that are no longer in active use. Even for more experienced developers, having inconsistent programming styles can make reading and understanding code, such as to debug programs or to develop new code that builds on the older code, more difficult and time consuming.

Issues with legacy code can thus inhibit developing new code, and in having reliable program operation, both for newer code and older code. In particular, it is increasingly common for enterprises that use large, complex software applications to use such applications provided as a cloud service, rather than having the application installed on their own premises. In additional to reducing hardware needs, moving to cloud-based services can be beneficial to users as the application provider can be responsible for configuring and maintaining the software. However, users may expect software to be more reliable if it is being provided as a cloud service, and legacy code can make this more difficult, for the reasons discussed above.

As also discussed above, it can be unfeasible to manually rewrite (or refactor) existing code. In addition, even if such refactoring was attempted, it can be difficult to ensure that all developers involved in a refactoring project handle changes in a consistent way. If changes are not made consistently, the chances of errors occurring can increase, and the inconsistency can make it harder to read and follow the code.

Disclosed technologies provide for automatic code refactoring. Code to be refactored includes procedural calls to functions. The procedural calls can be converted to calls to a method of a class that implements an interface, where the class includes a call to the function originally called by the code to be refactored. That is, rather than completely rewriting the code to be refactored, or rewriting the functions called by such code, code that uses the functions can be rewritten in a way that is more object-oriented, and can be easier for a developer to read and understand. However, this refactoring can create additional benefits by decoupling the refactored code from the functions. Rather than calling the function directly, the refactored code calls an interface method, which in turn calls a method implemented by a class that implements the interface. By changing the class associated with the interface, the functionality of the refactored code can be changed without additional changes to the refactored code, and without changes to the code of the function.

In other cases, code from a function called by code to be refactored can be included in the class. In this case, the function need no longer be used. However, the functionality of the refactored code can be easily changed by using a different class that implements the same interface whose method is called by the refactored code.

Changing the functionality can be useful for testing purposes. For example, when code is released for production, it may call an external method. However, calling the method may incur costs (e.g., a call to an API method or similar function that is provided on a fee for use basis, such as to obtain currency conversion data, stock price data, weather data, traffic data, etc.). Or, calling the external method can generate different results at different times the method is called. It can be helpful for code evaluation and debugging to have a method call provide consistent results so that issues can be isolated to code being developed. Thus, during testing, a first class can be used with the interface, which calls a method specific for testing. During production, a second class can be used with the interface, where the class calls the actual function (or method) to be used during production. So, testing is made much easier and flexible, and does not require changes to the interface, the refactored code, or methods or functions called by refactored code, which can be helpful if other programs are actively using the production function/method.

Disclosed techniques can be particularly useful, for example, when the function being called is an external function. As used herein, an external function refers to a function that is part of a different file than code being refactored. The external function can be an independent function, which is a function that is independently useable by multiple programs. An example of independent, external functions are function modules in the ABAP programming language.

In particular embodiments, function calls that are refactored using disclosed technologies are calls to functions that are not member functions (i.e., methods) of a class, or otherwise incorporated into a class (e.g., are not part of a definition of a class or other abstract data type). However, code to be refactored can, in some implementations, be part of a function, including a function that is a member function of a class, or a function that is itself an external function. In this way, for example, classes that have dependencies on functions that are not part of a class, or otherwise implemented using an object-oriented programming design, can be refactored to be more object-oriented.

In a more specific example, a programming language in which source code to be refactored is written includes different types of function calls. At least one type, corresponding to a function call to be refactored, is associated with a particular keyword in the programming languages. Function calls with the keyword can be identified and refactored.

The refactoring process can be automated. Automating the refactoring process can be beneficial, as otherwise it would not be practicable to refactor many programs. In addition, refactoring can be performed much more quickly, and with greater consistency and accuracy than manual refactoring.

Other types of legacy code can also be updated as part of a disclosed refactoring process. For example, error handling in older code may be implemented differently than in newer code. When code is being refactored, it can be beneficial to update the error handling to a currently used programming paradigm, to improve code consistency and readability.

Example 2—Example Code Having Calls to External Functions

FIG. 1 illustrates how code 100 can call one or more external function modules 110 of a function group 106. The code 100, the function group 106, and the function modules 110 can be implemented in any suitable programming language. In a particular example, including as shown in FIG. 1, the programming language can be ABAP. However, the disclosed technologies can be applied to programing languages other than ABAP, and for called functions other than function modules, including providing techniques for updating older C code to take advantage of object-oriented features of C++. In some cases, C++ can include procedure calls to functions in external files, including functions that are part of a group, such as part of a library.

The code 100 includes a call 120 to an external function, GET_PLANE_TYPE, which is implemented as a function module 110a of the function group 106. Note that the function modules 110 of the function group 106 can be called by other programs 114. Thus, if changes are made to the function module 110a to accommodate the code 100, such as for testing purposes, the changes will also affect the other programs 114. If the function module 110a is not changed, because the call 120 in the code 100 is specific to the function module 110a, the behavior of the code 100 cannot be altered without changing the call in the code 100. Making such changes can be error prone and cumbersome, especially if the code contains many calls to function modules.

As discussed in Example 1, note that the function group 106 includes a plurality of related function modules 110. In the example of FIG. 1, all of the function modules 110 relate to an airplane reservation system, where the function module 110a allows the program to retrieve a plane type (e.g., for a particular flight), while other function modules 110 can be used to determine a number of seats (e.g., on a particular style of plane or a number of seats still available for a particular flight), to get a flight schedule (e.g., between an origin and destination), to reserve a seat, and to release a seat. Although FIG. 1 is shown as including function groups 106, disclosed technologies can be implemented in scenarios without function groups. That is, procedural calls to functions can be replaced with object-oriented artifacts regardless of whether a function is part of a function group.

Example 3—Example Code Refactoring Artifacts

Figure 2:
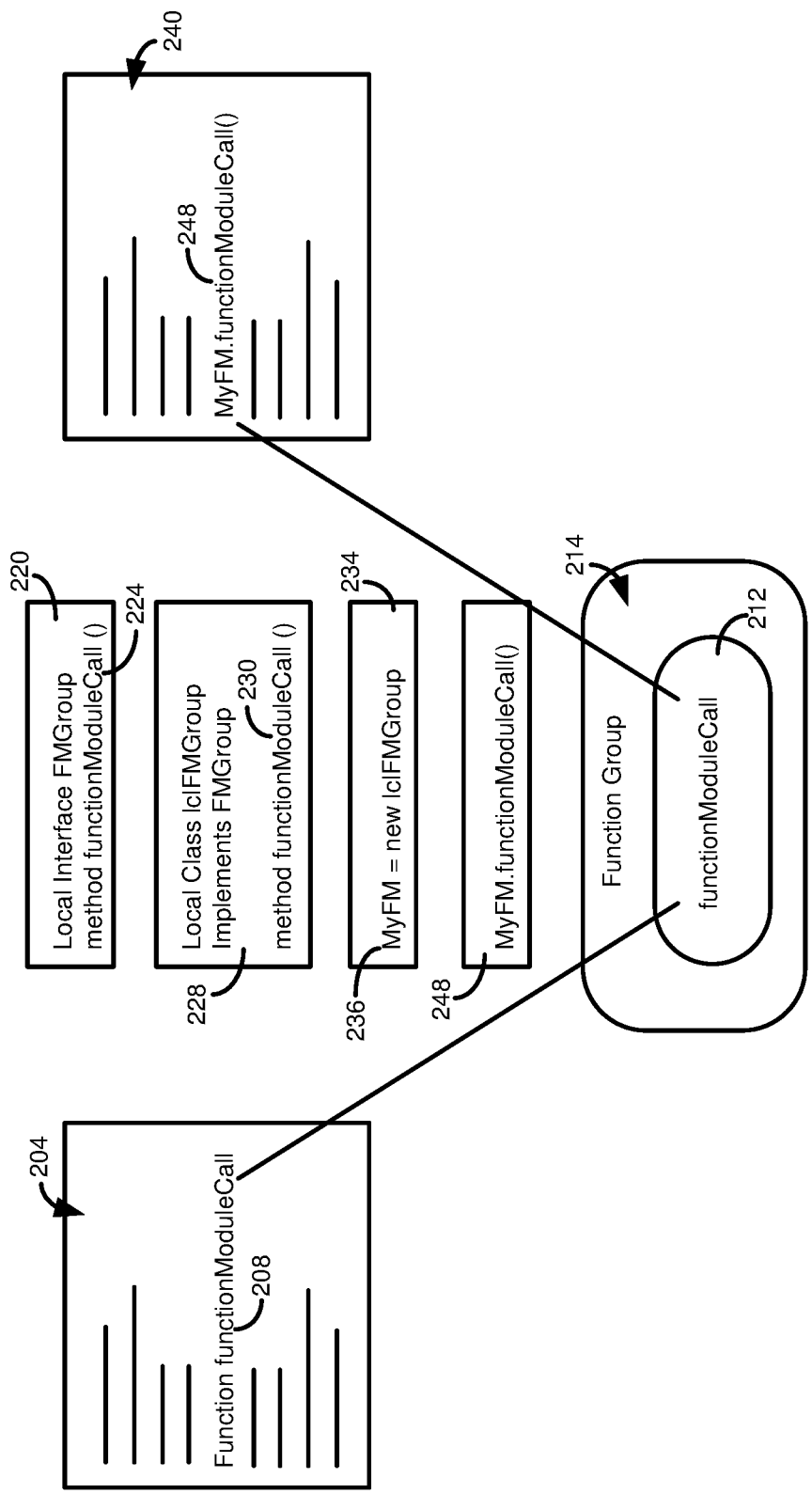
FIG. 2 is a diagram illustrating how computing artifacts can be generated for code to be refactored and used by refactored code.

As described in Example 1, disclosed technologies provide for code refactoring by replacing calls to an external function with a call to an intermediate object, such as an interface. In a specific example, the call to an intermediate object can be a call to an interface method, where the interface method is implemented by a class that implements the interface. FIG. 2 illustrates code 204 that is to be refactored. The code 204 includes a call 208 to a function 212, which is shown as part of a function group 214.

In some cases, an interface and/or a class can be local artifacts—artifacts that are used by a specific program. In other cases, an interface and/or class can be global artifacts—artifacts that are available to be used by multiple programs. In some programming languages, such as ABAP, when a class is referenced, it is first determined whether a local class is available. If no local class is available, then it is determined whether there is a matching global class.

As part of the code refactoring, a number of computing artifacts can be created. One of the computing artifacts is an interface 220. The interface 220 can include a method 224 that corresponds to the call 208. That is, while the method 224 does not directly call the function 212, it can be used with other computing artifacts to call the function, or another desired function that is desired to be called in place of the originally-called function, such as for testing purposes. The method 224 can be a virtual or pure virtual method.

A class 228 is a computing artifact that implements the interface 220, and incudes a class method 230 that corresponds to the method 224. The class method 230 includes an implementation, which can, in some cases, simply be a call to the function 212. However, as will be further discussed, other classes can implement the interface 220, and can include a class method that corresponds to the method 224. These other classes can call functions other than the function 212. For example, these other classes can call functions that are useful in software development, including testing and debugging.

A variable (or object) declaration 234 is another computing artifact that is created, and can be included in a modified code version 240 that is created based on, and in some cases includes, one or more of the computing artifacts. The variable declaration 234 declares an instance, or object, of the local class 228, having a name or identifier 236. The modified code version 240 includes a computing artifact in the form of code 248 that calls the method 224 of the interface 220. Calling the method 224 in the modified code version 240 results in a call to the method 230 of the class 228 used to instantiate the object 236. Because the variable declaration 234 declared the object 236 as an instance of the class 228, the method 230 is called when the code 248 is executed.

While in some cases the variable declaration 234 is included in the modified code version 240, in other cases the variable declaration 234 can be included in other code that is processed in conjunction with the modified code. For example, a separate file can include the variable declaration 234, and can be linked to a file with the modified code version 240. Having the variable declaration 234 in a file other than a file with the modified code version 240 can be beneficial in some cases, as it can make it easier to change the class used in the variable declaration (e.g., from a production class to a test class, or vice versa).

FIG. 2 illustrates how a single call 208 to a function 212 can be refactored. However, a similar process can be used to refactor code that includes multiple function calls. In at least some cases, at least a portion of the computing artifacts can be used in refactoring multiple calls. For example, multiple calls can use the same interface 220 and class 228. When a new function call of the code 204 is processed, a corresponding interface method can be added to the interface 220 and to the class 228. Similarly, if code 204 includes multiple calls of a given function, after the interface 220 and class 228 have been updated to include a method for the given function, additional calls to the function can use such method (and interface and class). That is, the modified code version 240 can replace all instances of a given function call with calls to a method of the local class 228.

Similarly, once an interface 220 and class 228 have been defined, those artifacts can potentially be used by multiple code files. In some cases, an interface 220 or class 288 can include a larger number of methods than are used by particular refactored code. For example, if an interface and class include methods A, B, C, D, E, first refactored code may call methods A, B, C, while second refactored code may call methods C, D, E.

Example 4—Example Decoupling of Classes from Refactored Source Code

Figure 3:
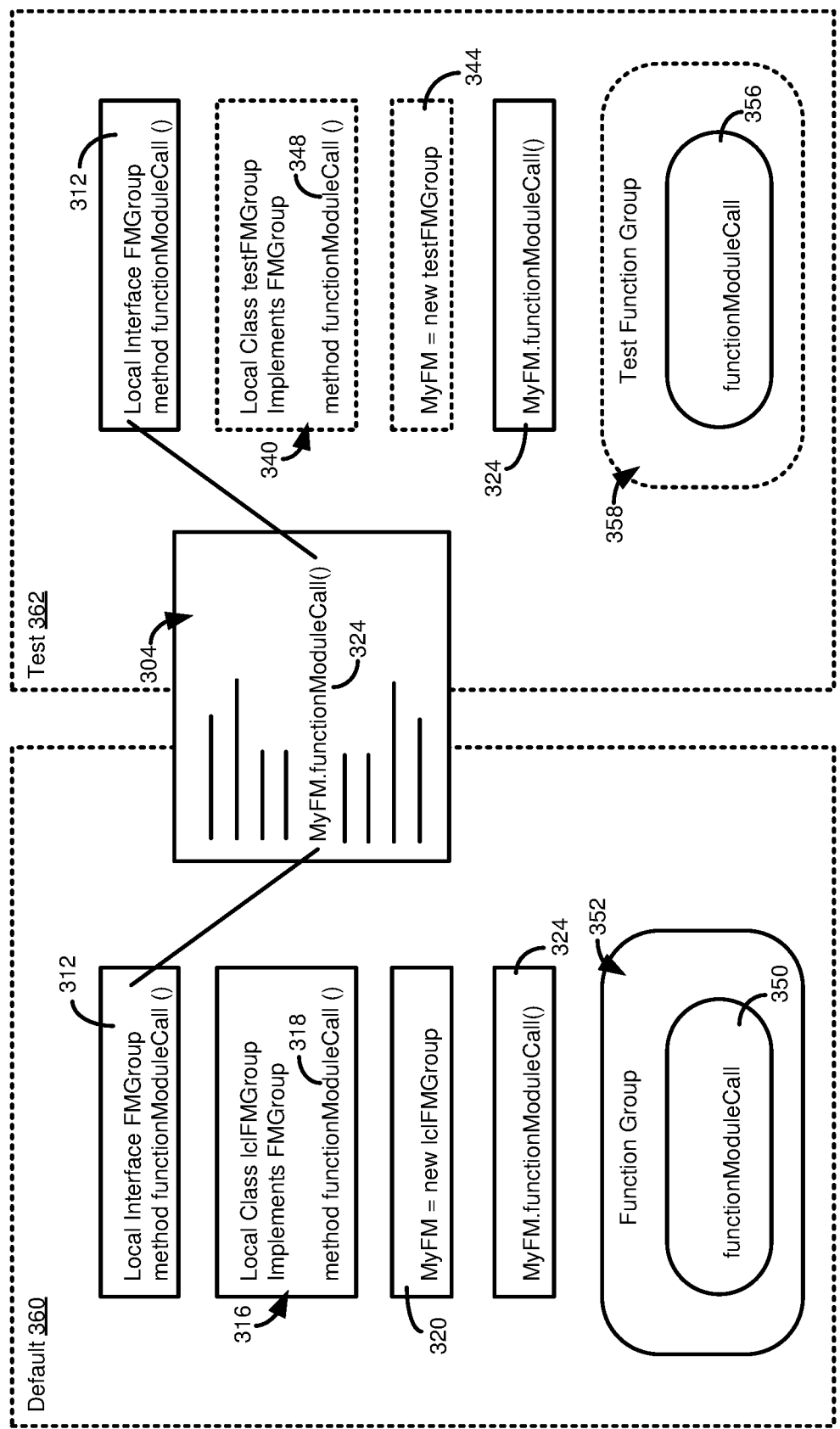
FIG. 3 is a diagram illustrating how refactored code functionality can be changed by changing a class used with an interface having a method called by the refactored code, such from a class used in a default scenario to a class used in a testing scenario.

As discussed in Example 3, a benefit of the disclosed technologies is that through polymorphism, many classes can implement an interface that includes a method implementing an interface method. The actual method that is called during software execution can be changed by changing the class in which an object is instantiated. For example, during testing the code "object 1=new testObject" can be used, while during normal execution the code "object 1=new realObject" can be used. Provided that the refactored code is otherwise compatible with the testObject and realObject classes, no additional code changes are needed in order to switch between test and production code. FIG. 3 provides additional details regarding this scenario.

FIG. 3 illustrates code 304 that has been refactored as described in Example 3. As part of the refactoring, an interface 312 was created, as well as a class 316, an object declaration 320, and a replacement function call 324. The artifacts 312, 316, 320, 324 can be implemented analogously to the corresponding artifacts of FIG. 2 and Example 3.

FIG. 3 includes two additional artifacts: a second class 340 and a second declaration 344. Like the class 316, the second class 340 implements the interface 312. Also, like the class 316, the second class 340 incudes a method 348 that corresponds to a method called by a method call of the code 304 being refactored. However, while a method 318 of the class 316 calls a first function 350, shown in a first function group 352, the method 348 calls a second function 356, shown in a second function group 358.

Instead of instantiating an object as an instance of the class 316, the second declaration 344 instantiates the object as an instance of the second class 340. Note that because both the class 316 and the second class 340 implement the same interface 312, and include methods 318, 348 that correspond to a method called by the method call 306 of the code, the behavior of the refactored code 304 can be changed without changing the method call 324 (and in some cases, without otherwise changing the code). That is, in both a production scenario 360 and a test scenario 362, the code 304 includes the call 324 to a method of the interface 312: "MYFM.functionModuleCall( )." If the object was instantiated as an instance of the class 316, the external function 350 is called. If the object was instantiated as an instance of the second class 340, the external function 356 is called.

Example 5—Example Operations in Refactoring Code with Calls to Functions

Figure 4:
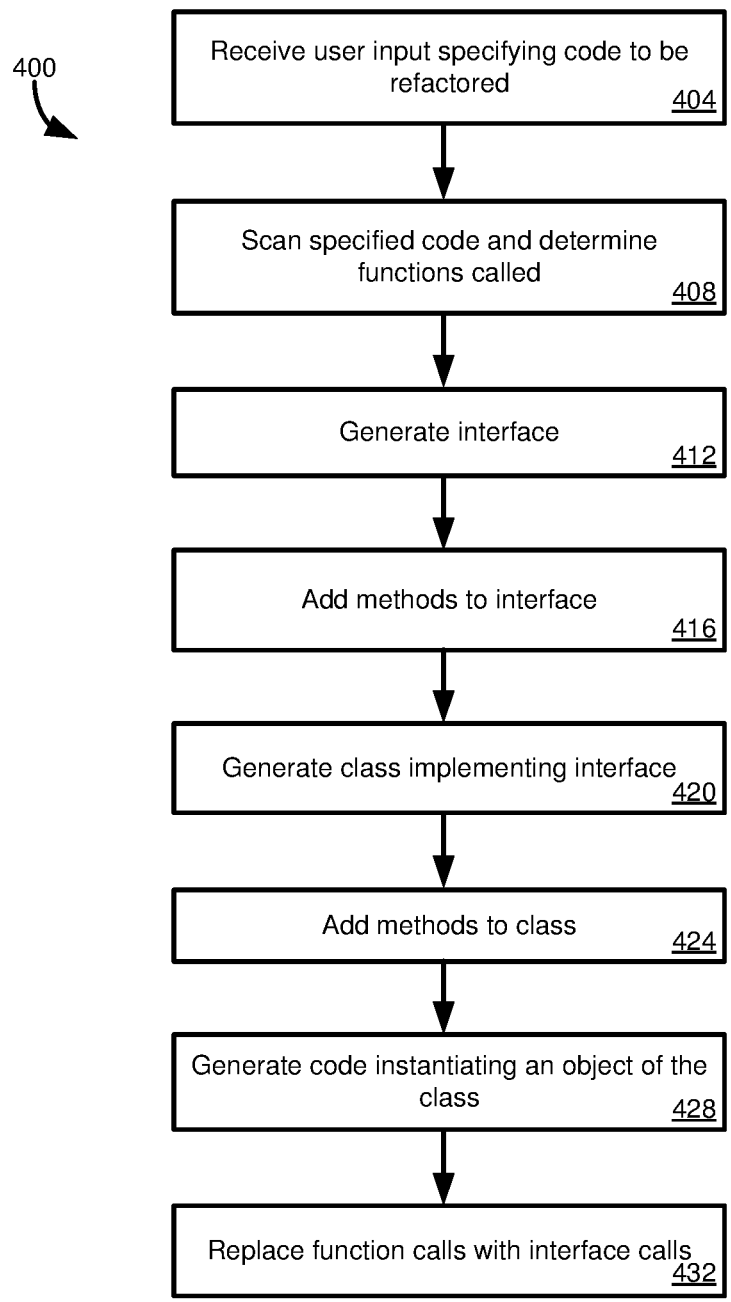
FIG. 4 is a flowchart illustrating example operations in code refactoring.

FIG. 4 is a flowchart illustrating operations 400 that can be performed during automated code refactoring using disclosed technologies. At 404, user input is received specifying code to be refactored. For example, the user input can specify one or more repositories or directories containing code to be refactored, or can specify particular files having code to be refactored. In further cases, code to be refactored can be provided via the user input, such as by copying and pasting the code into an application that provides code refactoring services.

The code is scanned at 408 to determine whether any functions are called, such as calls to a particular type of function, where such calls can be associated with a particular programming language reserved word. When any such function calls are identified, the function, the call, or both, can be added to a list or other data structure (e.g., stack, queue, graph, heap, vector, array, table, file). Information for the function can be added to an instance of a data type, which can be an abstract data type, and the data structure can store a plurality of instances of such abstract data type.

In some cases, when the code is scanned at 408, elements to be used in a method declaration in a computing artifact to be used by refactored code can be taken, or inferred from, the source code to be refactored. For example, elements such as return types and argument types can be read or inferred. In other cases, the function referenced by a given function call can be accessed in order to determine such information. However, if such information need not be gathered, or can be determined from the source code to be refactored, any functions called by the code may not need to be accessed during refactoring, at least if a method of the generated class continues to call the function, rather than independently implementing its functionality. If the class method will implement the function's functionality, typically the function called by the source code to be refactored will need to be accessed in order to incorporate source code from the function in source code for the class method.

At 412, an interface is generated. The interface can be analogous to the interface 220 of FIG. 2 or the interface 312 of FIG. 3. Methods, which can be virtual or pure virtual methods, are added to the interface at 416 for one or more function calls identified at 408 as called by the code.

A class implementing the interface is generated at 420. Methods corresponding to the interface methods added at 416 are created for the class at 424.

At 428, code is produced that, when executed, will cause an instance of the class to be generated. Refactored code is generated at 432 by replacing the external function calls of the specified code with calls to the corresponding methods of the interface generated at 416.

It should be appreciated that various changes can be made to the operations 400, including carrying out at least some of the operations in a different order than shown. For example, the interface and class can each be generated before any methods are added to them. Refactored code can be generated before code is produced that will cause an instance of the class to be generated.

Figure 5:
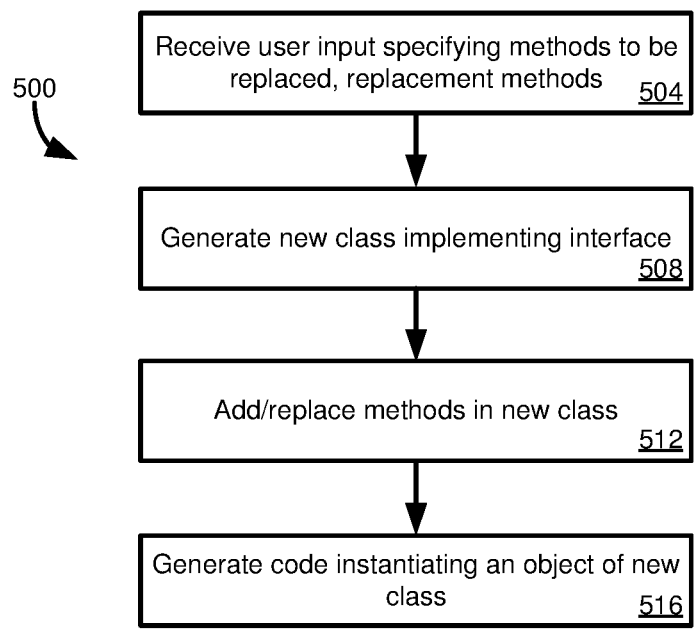
FIG. 5 a flowchart illustrating example operations in changing a class used by refactored code.

Example 6—Example Operations in Changing Class Implementing Interface Methods Called by Refactored Code FIG. 5 is a flowchart illustrating operations 500 that can be carried out in adapting refactored code to use methods of different classes (which can be local classes), which can be used to alter the behavior of the refactored code, such as during code development and testing. For the operations 500, it is assumed that an interface has already been created, such as described in the operations 400 of FIG. 4. It is further assumed that another class was already generated that implements the interface, and that code was created generating an instance of that class.

At 504, user input is received specifying one or more method calls that are to be replaced. For each method call that is to be replaced, a replacement, or substitute method to be called is also specified. A new class implementing the interface is generated at 508. At 512, methods are added or replaced in the new class corresponding to the user input received at 504. For example, in some cases, an existing class can be duplicated to provide the new class, so that the new class includes methods for any external functions called by code using the existing or new class. Methods specified in the user input 504 can be overwritten in the new class with the new methods specified in the user input. Or, the new methods specified in the user input can be added to the new class at 512, and then non-conflicting methods can be added from the existing class. Or, a new class can be created at 512 and populated only with methods provided in the user input 504, where some of the methods provided in the user input can be methods that correspond to methods of the existing class and some of the methods provided in the user input can correspond to different methods than in the existing class.

At 516, code is generated that creates an instance of the new class. Operations performed at 516 can include replacing code that created an instance of the existing class with code creating an instance of the new class.

Example 7—Example Implementations for Class Methods Corresponding to Interface Methods Called by Refactored Code Examples 1-6 describe creating classes that include calls to functions. That is, while code can be refactored to call interface methods, which are directed by a class to the functions (i.e., instead of having the code call functions directly), the "original" functions are still present. However, if desired, code implementing the original functions can be added to the class so that the original functions (and any associated function groups) need no longer be used. FIG. 6 illustrates these two scenarios.

FIG. 6 illustrates a function group 608 that includes a plurality of function modules 612. Implementation code is shown for a function module 612a, while code for the other function modules is not shown for simplicity of presentation. Code (not shown in FIG. 6) that includes calls to one or more of the function modules 612 can be refactored as described in Examples 1-6.

In a scenario 620, a first implementation 624 of a local class is created that includes calls 628 to the function modules 612. So, while the original code is refactored to no longer directly call the function modules 612, the function modules are still indirectly called through an interface (not shown in FIG. 6) and the first local class implementation 624.

In a scenario 640, a second implementation 644 of a local class is created. Rather than simply calling the function module 612a, a method 648 of the second local class implementation 644 includes the code implementing the function module 612a. Thus, at least for function module 612a, a call in the code to be refactored to the function module 612a will no longer reference, directly or indirectly, the function module 612a.

Note that mixtures of the scenarios 620, 640 may be carried out for code to be refactored/a given local class. That is, some methods of the local class can call a function module 612, while other methods of the local class can incorporate code implementing functionality of a function module 612 so that the function module 612 is no longer called.

Example 8—Example Refactoring Pseudocode

FIG. 7 presents pseudocode 700 for operations in code refactoring using disclosed technologies. The operations in the pseudocode can at least generally correspond to the operations 400 of FIG. 4.

In line 1, a refactoring target is obtained, such as from a user. The refactoring target can be code, a file containing code, or a repository containing files that contain code. Some of the code in the refactoring target may not meet refactoring criteria. For example, if the refactoring target is a repository or directory, some files may include code having external function calls that can be refactored using disclosed technologies, while other code may be free of such external function calls.

Line 2 describes that code in the refactoring target is scanned for external function calls. If external function calls are identified, they are added to the list "fmList."

An interface for the refactoring target is generated at line 3. A local class for the refactoring target is generated at line 4. Line 5 determines whether the refactoring target (or a current element, such as a file, of the refactoring target) is a function group. That is, disclosed technologies can be used not only to refactor code that includes calls to external functions (e.g., function modules in ABAP) that may be part of a function group, but can also be used to refactor function modules (if the function module has calls to other functions) and function groups.

If the target is a function group, a code statement initializing the local class (e.g., creating an instance of the class) is added to program loading information (e.g., a configuration file) at line 6. If the target is not a function group, a code statement creating an instance of the class is added to the code being refactored, or code that will be processed along with the code being refactored, at line 8.

Line 10 defines the start of a loop that executes for each function added to fmList. The declaration for the function is copied to the interface at line 11. At line 12, the function implementation is copied to the local class. Calls to external functions are replaced in the refactoring target in line 13 with calls to the interface methods created at line 11 which, when called, execute the implementation added to the local class at line 12.

Example 9—Example Code Refactoring of Function Calls Including Refactoring Error Handling Code As discussed above, particularly in Examples 7 and 8, in some cases, during refactoring, code that implements a function can be added to a class generated during refactoring such that the originally-called function is no longer called/is no longer needed. In addition to changes between procedural programming and object oriented programming approaches, other types of programming practices may have changed, such as error handling, and code implementing such other features can be updated or refactored in addition to replacing function calls to calls to methods of an interface having a class which implements the interface.

Figure 8:
FIG. 8 is example ABAP code to be refactored, having error handling code.

FIG. 8 illustrates example code 800 for a function module. The code includes, at line 8, a call to another external function (ABAP function module). The call can include a number of components, specified in lines 9-17, including exception handling components set forth in lines 14-17. Like calls to external functions, the exception handling components can be problematic, in that they can be difficult to test, are not implemented in an object-oriented way, and may be difficult to read/understand, particularly if developers are used to working with other types of error handling.

The code in lines 15-17 defines particular errors, and associates particular numeric values with those errors, which values will be assigned to a system error variable ("sy-subrc") if the corresponding exception occurs during program execution. One problem with this type of error handling is that it can be difficult to understand what an error code means without looking at the code 800. If the variables in the code 800 are not given meaningful names, or if the code is otherwise not well documented, it can be difficult to understand the type of errors and error handling implemented in the code.

FIG. 9 illustrates code 900 for computing artifacts generated from refactoring the code 800 using the technologies described in Examples 1-8. Lines 4-13 reflect the interface that was generated by refactoring. It can be seen that the interface includes, at line 6, a method "zgj_fm1_1" which corresponds to the external function called at line 8 of the code 800 of FIG. 8.

Lines 17-49 reflect the local class that was generated by refactoring. It can be seen that the local class includes, at line 23, a method "lif_doc~zjg_fm1_1" that corresponds to the interface method of line 6. At line 24, the external function called in line 8 of the code 800 of FIG. 8 is called by the local class of the code 900.

The code 900 includes error-handling code at lines 34-46 that uses a newer error handling regime of "RAISE EXCEPTION TYPE" that provides meaningful text 910 regarding the meaning of error codes assigned to the sy-subrc variable when an error occurs. Thus, the code 900 can be easier for developers to read, and for developers or users to debug or otherwise troubleshoot, given that meaningful text 910 is returned instead of numeric error codes.

Continuing the refactoring example, code 1000 of FIG. 10 illustrates how a load of program statements for a function group can be modified at part of code refactoring. That is, the code 800 is for a function group that is refactored to provide the code 900. In a load of program statements for the function group, at lines 6 and 8 of the code 1000, a new local class instance, mo_doc, is created.

FIG. 11 illustrates refactored code 1100 corresponding to the code 800 of FIG. 8 but refactored in view of the computing artifacts of the code 900 of FIG. 9. At line 7 of the code 1100, the method of line 23 of the code 900 is called, which in turns calls the external function at line 24 of the code 900. The components of the method call of FIG. 8, at lines 9-17 of the code 800, are included in the call as arguments. However, the error handling components have been modified to a try/catch format, with the try statement at line 6 of the code 1100 and the catch statement at line 14 of the code 1100. As part of the modification to a try/catch exception handling, the code 1100 maps the meaningful text 910 of the code 900, returned by the function call, to error codes for the sy-subrc variable, so that the remaining exception handling code at lines 24-31 of the code 1100, carried over from the code 800, can continue to be used without requiring additional modification of the code 800.

Although this Example 9 describes refactoring of error handling code in conjunction with refactoring code for function calls, the error handling refactoring can be used in other scenarios. For example, in some cases it may be useful to refactor error handling code in code that does not include calls to external functions, and thus does not require refactoring to remove calls to external functions.

Example 10—Example Code for Implementing Code Refactoring

Figure 12I:
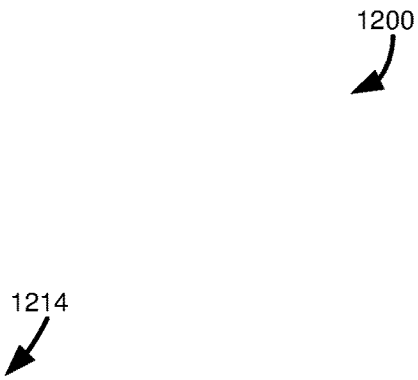
FIGS. 12A-12Q provide example ABAP code for implementing disclosed technologies.

FIGS. 12A-12Q provide example ABAP code for implementing disclosed technologies. The code assumes that a user has already provided input identifying target code to be refactored, that code has been scanned to identify calls to functions to be refactored, and that a list of such functions is available. Note that some programming languages, such as ABAP, provide particular key/reserved words/syntax elements for calling particular types of functions (e.g., external functions, procedural function calls), and code can be scanned for such keywords in order to identify function calls that should be refactored. For example, in ABAP, the code can be scanned for instances of "CALL FUNCTION." The code surrounding an external function call can be parsed, such as to extract import and export parameters, return objects, and exception handling features. For example, such code elements typically also include particular key words (e.g., "EXPORTING") and syntax elements that mark the stop and start of these elements.

FIG. 12A illustrates code 1200 for a class that can be called in conducting code refactoring using disclosed technologies. The code includes a method 1204, "create_doc_for_decoupling," that can be used to create a file or other container to hold refactored code, and optionally artifacts that can be used/called by the refactored code, such as an interface and a class. In FIGS. 12B and 12C, method 1206, "create_lcl_doc," creates a local class to be used by refactored code. With reference to FIGS. 12D and 12E, method 1210, "create_lif_doc," creates an interface to be used by refactored code.

In FIGS. 12F-12I, a method 1214, "zjg_ase_refact_if_converter~convert_fm_def_to_intf_def," reads external function definitions and creates corresponding methods in the interface generated using method 1210. In FIG. 12J, a method 1218, "METHOD zjg_ase_refact_if_converter~create_class_definition," calls functions to read external function definitions and create corresponding methods in the class generated using the method 1206.

FIG. 12K provides code 1250 that provides a class definition 1254 for a class that can be used in producing refactored code, such as replacing calls to external functions with calls to computing artifacts, such as an interface, generated during refactoring. In FIG. 12L, a method 1256, "create_doc_meth_code," can be used to generate a document, or file, to hold refactored code. With reference to FIGS. 12M-12O, a method 1260, "get_meth_params_as_code," can be used to get method parameters from the code to be refactored. In FIGS. 12P and 12Q, a method 1264 can be used to generated refactored code using the method parameters gathered during execution of method 1260.

Example 11—Example Code Refactoring Cloud Service

In some cases, disclosed technologies can be performed using the same computing system on which code to be refactored is stored, and where refactored code is to be executed. In other cases, a code refactoring service can be provided that can be accessible to one or more other computing systems.

Figure 13:
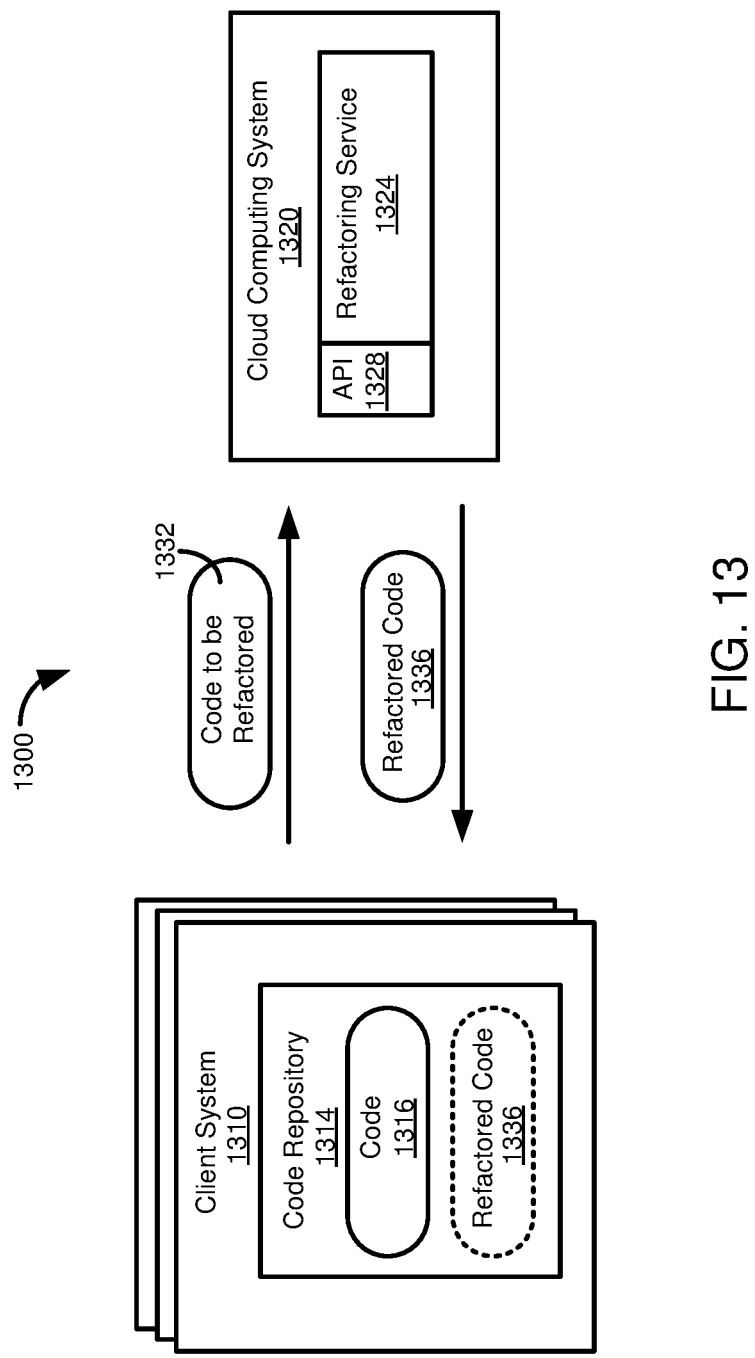
FIG. 13 is a diagram illustrating how disclosed technologies can be provided as part of a cloud-based service.

For example, FIG. 13 illustrates a computing environment 1300 in which code refactoring is provided as a cloud-based service. The computing environment 1300 includes one or more client systems 1310. Each of the client systems 1310 includes a code repository 1314 storing code 1316. At least a portion of the code 1316 may benefit from being refactored using disclosed technologies.

The cloud computing environment 1300 also includes a cloud computing system 1320. The cloud computing system includes a code refactoring service 1324. The client systems 1310 may access the code refactoring service 1324, such as using an API 1328 presented by the code refactoring service. When calling the API 1328, a client system 1310 can provide code to be refactored 1332 from the code 1316. In response, the refactoring service 1324 can return refactored code 1336, which can be stored in the code repository 1314.

Example 12—Example Refactoring Operations

Figures 14A, 14B:
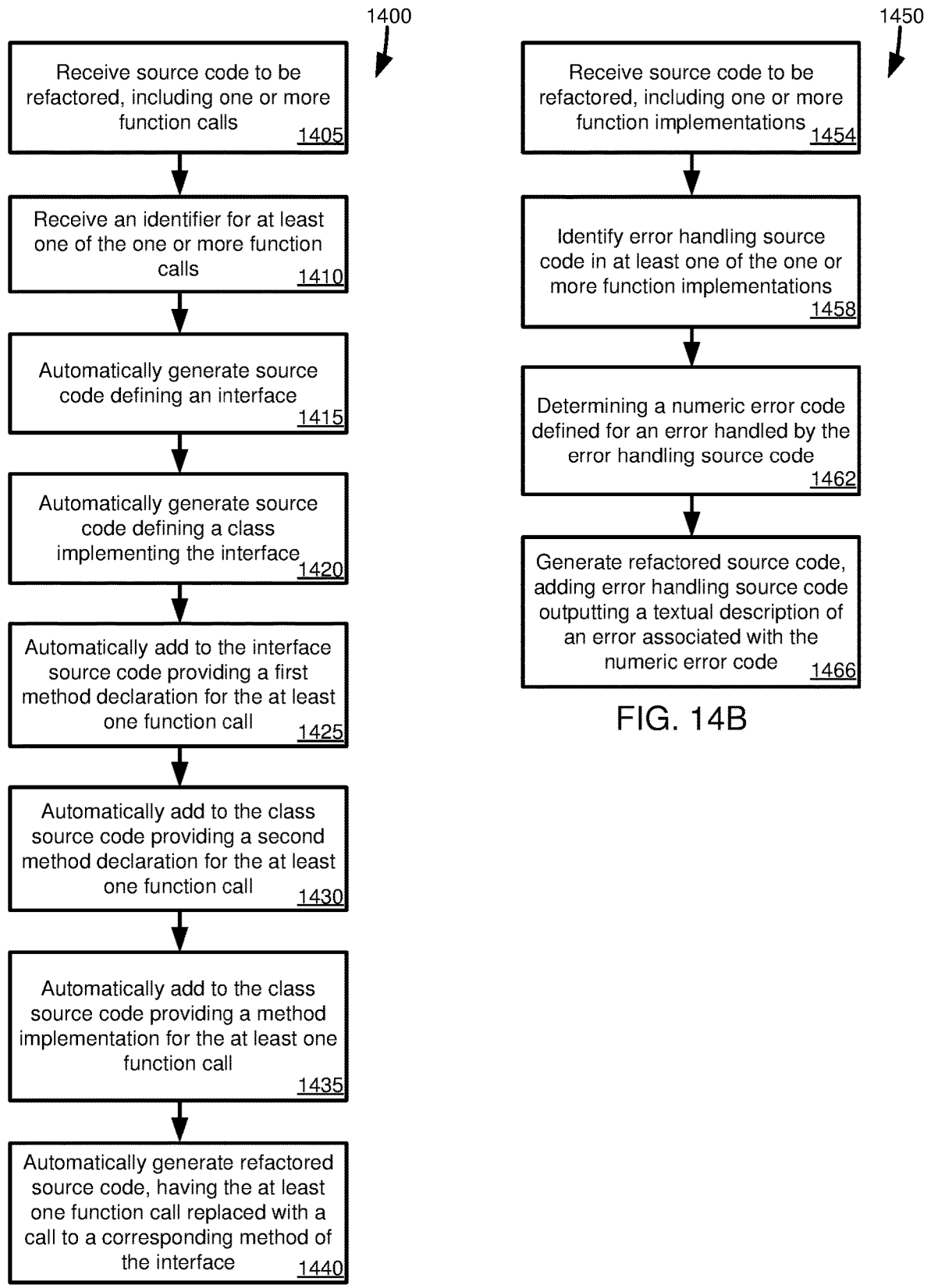
FIGS. 14A and 14B are flowcharts of operations for code refactoring using disclosed technologies.

FIG. 14A is a flowchart of example operations 1400 in carrying out code refactoring using disclosed technologies, including as described in Examples 1-11. At 1405, source code to be refactored is received. For example, source code can be sent as part of a call to a refactoring service, or can be retrieved from a file or repository, including based on identifiers provided by a user. The source code includes one or more function calls. An identifier for at least one of the one or more of the function calls is received at 1410. In an implementation, the operations at 1410 can include scanning the source code to be refactored, such as for key words that indicate that a function call matches a particular type (such as to a function module or other external function). In another implementation, the results of such scanning are provided at 1410.

At 1415 source code is automatically generated that defines an interface. Source code defining a class that implements the interface is automatically generated at 1420. At 1425, a first method declaration for the at least one of the one or more function calls is added to the interface. A second method declaration for the at least one of the one or more function calls is added to the class at 1430. At 1435, a method implementation for the at least one of the one or more function calls is added to the class.

Refactored source code is automatically generated at 1440. The refactored source code has the at least one function call replaced with a call to a corresponding method of the interface.

FIG. 14B is a flowchart of example operations 1450 in carrying out code refactoring using disclosed technologies, including as described in Examples 1-11, particularly in conjunction with Example 9. At 1454, source code to be refactored is received. The source code includes one or more function implementations (which can be methods of a class, or other types of functions). Error handling source code is identified in at least one of the one or more function implementations at 1458. At 1462, a numeric error code defined for an error handled by the error handling source code is determined. Refactored source code is generated at 1466, the refactored source code adding error handling source code outputting a textual description of an error associated with the numeric error code.

Example 13—Computing Systems

Figure 15:
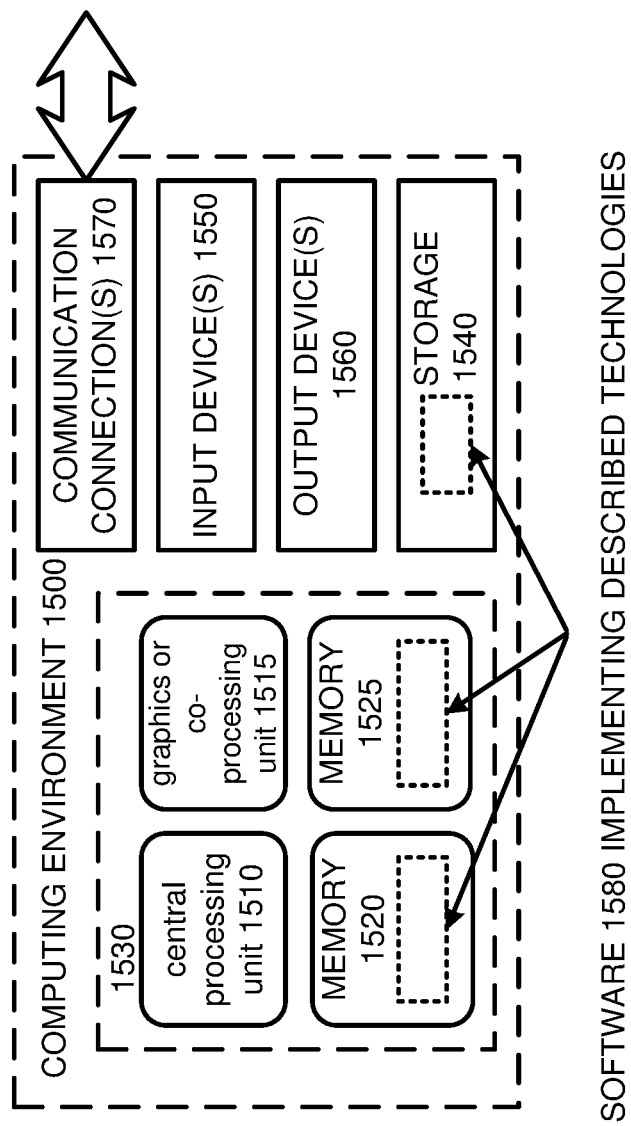
FIG. 15 is a diagram of an example computing system in which some described embodiments can be implemented.

FIG. 15 depicts a generalized example of a suitable computing system 1500 in which the described innovations may be implemented. The computing system 1500 is not intended to suggest any limitation as to scope of use or functionality of the present disclosure, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing technologies described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515.

A computing system 1500 may have additional features. For example, the computing system 1500 includes storage 1540, one or more input devices 1550, one or more output devices 1560, and one or more communication connections 1570. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 may be removable or non-removable, and includes magnetic disks, magnetic tapes or cassettes, CD-ROMs, DVDs, or any other medium which can be used to store information in a non-transitory way, and which can be accessed within the computing system 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing system 1500. The output device(s) 1560 may be a display, printer, speaker, CD-writer, or another device that provides output from the computing system 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 16:
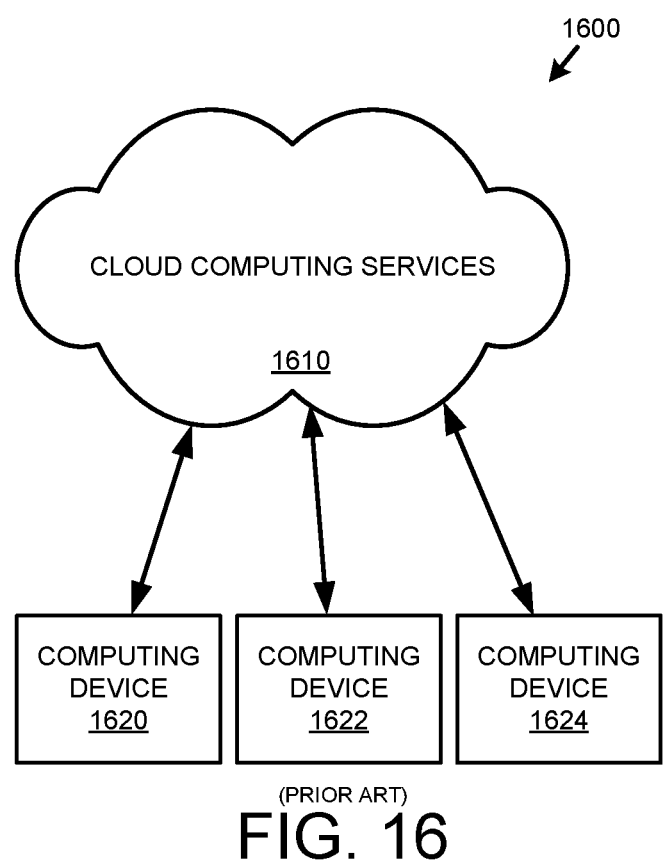
FIG. 16 is an example cloud computing environment that can be used in conjunction with the technologies described herein.

FIG. 16 depicts an example cloud computing environment 1600 in which the described technologies can be implemented. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries).

The cloud computing services 1610 are utilized by various types of computing devices (e.g., client computing devices), such as computing devices 1620, 1622, and 1624. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operators (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 15, computer-readable storage media include memory 1520 and 1525, and storage 1540. The term computer-readable storage media does not include signals and carrier waves. In addition, the term computer-readable storage media does not include communication connections (e.g., 1570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, JAVA, PERL, JAVASCRIPT, PYTHON, R, RUBY, ABAP, SQL, XCODE, GO, ADOBE FLASH, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
    receiving source code to be refactored, the source code expressed in a first programming language and comprising one or more function calls;
    parsing the source code to determine statements in the source code;
    storing the statements of the source code in one or more data structures;
    for statements in the one or more data structures, determining if a given statement comprises a function call of the one or more function calls;
    for given statements in the one or more data structures determined to comprise a function call of the one or more function calls:
        (i) determining a first token associated with the function call of the given statement;
        (ii) determining a last token associated with the function call of the given statement;
        (iii) submitting tokens associated with the function call of the given statement, from the first token to the last token, to a parameter extraction function that extracts function call parameters of the function call of the given statement from the tokens to provide extracted function call parameters, the extracted function call parameters comprising one or more parameter identifiers, at least one operator associated with at least one parameter identifier of the one or more parameter identifiers, and at least one value associated with the at least one operator and the at least one parameter identifier; and
        (iv) storing the extracted function call parameters in one or more instances of one or more datatypes;
    automatically generating source code defining an interface;
    automatically generating source code defining a class that implements the interface;
    automatically adding to the interface source code providing a first method declaration for at least one function of the one or more functions;
    automatically adding to the class source code providing a second method declaration for the at least one function of the one or more functions;
    automatically adding to the class source code a method providing an implementation for the at least one function of the one or more functions; and
    automatically generating refactored source code in the first programming language, the refactored source code having at least one function call of the one or more function calls replaced with a call to a corresponding method of the interface.

2. The computer-implemented method of claim 1, further comprising, for a function called by a function call of the one or more function calls:
    identifying error handling source code in an implementation of the function; and
    determining a numeric error code defined for an error handled by the error handling source code;
    wherein the automatically generating refactored source code comprises adding error handling source code outputting a textual description of the error in place of the numeric error code.

3. The computer-implemented method of claim 1, further comprising:
    for statements determined to comprise a function call, determining if a function called by the given function call is permitted to be refactored.

4. A computing system comprising:
    memory;
    one or more processing units coupled to the memory; and
    one or more computer readable storage media storing instructions that, when executed, cause the computing system to perform operations comprising:
        receiving source code to be refactored, the source code expressed in a first programming language and comprising one or more function calls to one or more functions;
        parsing the source code to determine tokens and statements in the source code;
        storing the tokens of the source code in a first data structure;
        storing the statements of the source code in a second data structure;
        for statements in the second data structure, determining if a given statement comprises a function call of the one or more function calls;
        for given statements determined to comprise a function call of the one or more function calls;
            (i) determining a first token associated with the function call of the given statement;
            (ii) determining a last token associated with the function call of the given statement;

(iii) submitting tokens associated with the function call of the given statement, from the first token to the last token, to a parameter extraction function that extracts function call parameters of the function call of the given statement from the tokens to provide extracted function call parameters, the extracted function call parameters comprising one or more parameter identifiers, at least one operator associated with at least one parameter identifier of the one or more parameter identifiers, and at least one value associated with the at least one operator and the at least one parameter identifier; and (iv) storing the extracted function call parameters in one or more instances of one or more datatypes;

automatically generating source code defining an interface;

automatically generating source code defining a class that implements the interface;

automatically adding to the interface source code providing a first method declaration for at least one function of the one or more functions, the first method declaration being formed using a method declaration function;

automatically adding to the class source code providing a second method declaration for the at least one function of the one or more functions;

automatically adding to the class source code a method implementation for the at least one function of the one or more functions; and automatically generating refactored source code in the first programming language, the refactored source code having at least one function call of the one or more function calls replaced with a call to a corresponding method of the interface.

5. The computing system of claim 4, the operations further comprising:
generating source code creating an instance of the class.

6. The computing system of claim 5, the operations further comprising:
adding to the refactored source code source code creating an instance of the class.

7. The computing system of claim 4, wherein the class is a local class.

8. The computing system of claim 4, wherein the class is a first class, the operations further comprising:
generating source code defining a second class that implements the interface;
adding to the second class source code providing a third method declaration for at least one of the one or more function calls; and
adding to the second class source code a method implementation for the third method declaration, wherein the method implementation for the third method declaration is different than a method implementation for the second method declaration.

9. The computing system of claim 8, the operations further comprising:
adding to the refactored source code source code creating an instance of the second class.

10. The computing system of claim 4, wherein an implementation of the second method declaration calls a function called by a function call of the one or more function calls.

11. The computing system of claim 4, wherein an implementation of the second method declaration comprises functionality implemented by a function called by a function call of the one or more function calls.

12. The computing system of claim 4, wherein an implementation of the second method declaration does not call a function called by a function call of the one or more function calls.

13. The computing system of claim 4, the operations further comprising:
identifying error handling source code for a function called by a function call of the one or more function calls;
determining a numeric error code defined for an error handled by the error handling source code; and
in source code providing a method implementation for the second method declaration, adding error handling source code outputting a textual description of an error associated with the numeric error code.

14. The computing system of claim 4, wherein the determining if a given statement comprises a function call comprises determining if the statement comprises a designated keyword in a programming language in which the source code is written.

15. The computing system of claim 4, wherein the operations are implemented by one or more classes defined in a programming language.

16. The computing system of claim 4, wherein the operations are performed by a refactoring service of a cloud computing system and the receiving source code to be refactored comprises receiving source code from a client computing system.

17. The computing system of claim 4, wherein the entirety of the source code is scanned, and statements stored in the second data structure, prior to the determining if a given statement comprises a function call.

18. The computing system of claim 4, the operations further comprising:
adding to a log a message indicating a method for a refactored function call was added to the interface.

19. The computing system of claim 4, the operations further comprising:
for statements in the second data structure determined to comprise a function call, determining if a function called by the given function call is permitted to be refactored.

20. One or more tangible computer readable storage media storing computer executable instructions that, when executed by a processor of a computing system, cause the computing system to perform operations comprising:
receiving source code to be refactored, the source code expressed in a first programming language and comprising one or more function calls to one or more functions;
parsing the source code to determine tokens and statements in the source code;
storing the statements of the source code in one or more data structures;
for statements in the one or more data structures, determining if a given statement comprises a function call of the one or more function calls;
for given statements determined to comprise a function call of the one or more function calls:
(i) determining a first token associated with the function call of the given statement;
(ii) determining a last token associated with the function call of the given statement;
(iii) submitting tokens associated with the function call of the given statement, from the first token to the last token, to a parameter extraction function that extracts function call parameters of the function call of the given statement from the tokens to provide extracted function call parameters, the extracted function call parameters comprising one or more parameter identifiers, at least one operator associated with at least one parameter identifier of the one or more parameter identifiers, and at least one value associated with the at least one operator and the at least one parameter identifier; and (iv) storing the extracted function call parameters in one or more instances of one or more datatypes;

automatically generating source code defining an interface;

automatically generating source code defining a class that implements the interface;

automatically adding to the interface source code providing a first method declaration for at least one function of the one or more functions;

automatically adding to the class source code providing a second method declaration for the at least one function of the one or more functions;

automatically adding to the class source code a method implementation for the at least one function of the one or more functions; and automatically generating refactored source code in the first programming language, the refactored source code having at least one function call of the one or more function calls replaced with a call to a corresponding method of the interface.

* * * * *